(12) United States Patent
Takahashi et al.

(10) Patent No.: US 11,245,319 B2
(45) Date of Patent: Feb. 8, 2022

(54) VIBRATION ACTUATOR, WEARABLE TERMINAL, AND INCOMING CALL NOTIFICATION FUNCTION DEVICE

(71) Applicants: Yuki Takahashi, Tokyo (JP); Kazutaka Sakaguchi, Tokyo (JP); Yasutaka Kitamura, Tokyo (JP); Shigenori Inamoto, Tokyo (JP)

(72) Inventors: Yuki Takahashi, Tokyo (JP); Kazutaka Sakaguchi, Tokyo (JP); Yasutaka Kitamura, Tokyo (JP); Shigenori Inamoto, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 13 days.

(21) Appl. No.: 16/477,583

(22) PCT Filed: Jan. 5, 2018

(86) PCT No.: PCT/JP2018/000080
§ 371 (c)(1),
(2) Date: Jul. 12, 2019

(87) PCT Pub. No.: WO2018/131541
PCT Pub. Date: Jul. 19, 2018

(65) Prior Publication Data
US 2020/0127547 A1    Apr. 23, 2020

(30) Foreign Application Priority Data

Jan. 13, 2017 (JP) .............................. JP2017-004663

(51) Int. Cl.
*H02K 33/18*    (2006.01)
*G08B 6/00*    (2006.01)
*H04B 1/3827*    (2015.01)

(52) U.S. Cl.
CPC ............... *H02K 33/18* (2013.01); *G08B 6/00* (2013.01); *H04B 1/385* (2013.01)

(58) Field of Classification Search
CPC .......... H02K 33/16; H02K 33/18; G08B 6/00; B06B 1/04; B06B 1/045
See application file for complete search history.

(56) References Cited

U.S. PATENT DOCUMENTS

| | | | |
|---|---|---|---|
| 5,602,432 A * | 2/1997 | Mizutani | G08B 6/00 310/15 |
| 10,610,892 B2 * | 4/2020 | Takahashi | H04R 9/045 |

(Continued)

FOREIGN PATENT DOCUMENTS

| | | |
|---|---|---|
| JP | H09-85169 A | 3/1997 |
| JP | 2001-347224 A | 12/2001 |

(Continued)

OTHER PUBLICATIONS

International Search Report from International Application No. PCT/JP2018/000080 dated Mar. 27, 2018.
Extended European Search report dated Jul. 9, 2020.

*Primary Examiner* — Quyen P Leung
*Assistant Examiner* — Eric Johnson
(74) *Attorney, Agent, or Firm* — Brundidge & Stanger, P.C.

(57) ABSTRACT

This actuator has a stationary body having either a coil or a magnet, a movable body having the other, that is, a magnet or a coil, and an elastic body that supports the movable body so as to be capable of moving with respect to the stationary body. The movable body moves reciprocally with respect to the stationary body in the vibration direction due to concerted movement of the magnet and the energized coil. The magnet can advance into and separate from the interior of the coil in the vibration direction. The elastic body is a plate-shaped elastic body one end of which is secured to a (Continued)

stationary unit, the other end of which is secured to the movable body, and which supports the movable body with a cantilever structure so as to be capable of oscillating reciprocally in the vibration direction.

8 Claims, 16 Drawing Sheets

(56) References Cited

U.S. PATENT DOCUMENTS

| | | | |
|---|---|---|---|
| 10,610,893 B2* | 4/2020 | Takahashi | B06B 1/045 |
| 10,610,894 B2* | 4/2020 | Takahashi | B06B 1/045 |
| 2003/0072441 A1* | 4/2003 | Kobayashi | B06B 1/045 379/431 |
| 2003/0107336 A1 | 6/2003 | Kobayashi et al. | |
| 2004/0124795 A1 | 7/2004 | Mandai | |
| 2009/0167450 A1* | 7/2009 | Shinogi | H02K 33/18 331/156 |
| 2011/0095649 A1* | 4/2011 | Kagayama | H01L 41/0926 310/323.01 |
| 2011/0101796 A1 | 5/2011 | Odajima et al. | |
| 2015/0137627 A1 | 5/2015 | Katada et al. | |
| 2015/0328664 A1* | 11/2015 | Kim | B06B 1/0603 310/323.01 |
| 2019/0207496 A1* | 7/2019 | Takahashi | G06F 1/1684 |

FOREIGN PATENT DOCUMENTS

| | | |
|---|---|---|
| JP | 2002-263572 A | 9/2002 |
| JP | 2003-309897 A | 10/2003 |
| JP | 4875133 B2 | 5/2011 |
| JP | 2015-095943 A | 5/2015 |
| JP | 2015112013 A | 6/2015 |

* cited by examiner

VIBRATION ACTUATOR, WEARABLE TERMINAL, AND INCOMING CALL NOTIFICATION FUNCTION DEVICE

TECHNICAL FIELD

The present invention relates to a vibration actuator, a wearable terminal, and an incoming notification function device.

BACKGROUND ART

Conventionally, a vibration actuator has been known as a vibration generation source for notifying incoming calls and/or the like of mobile information terminals such as mobile phones to users or as a vibration generation source for transmitting a sense of touch when operating touch screens and a sense of reality in games played on amusement machines such as controllers of game machines to fingers, hands, feet, and the like (see Patent Literatures (hereinafter, each referred to as "PTL") 1 to 3, for example).

The vibration actuator disclosed in PTL 1 is formed flat to reduce the size. The vibration actuator of PTL 1 has a flat-plate shape in which a pivotally supported movable part is supported freely slidably by a shaft.

The vibration actuator disclosed in PTL 2 includes: a stator having a casing and a coil; and a movable element having a magnet and a weight disposed inside the casing, in which the movable element freely slidable with respect to a shaft linearly vibrates in a vibration direction with respect to the stator by cooperation work of the coil and the magnet. The coil is wound on an outer side of a movable part including the magnet.

Further, PTL 3 discloses an actuator of the VCM (Voice Coil Motor) principle, including opposite flat coils and flat magnets disposed on the flat coils.

The movable element is provided freely slidable to the shaft in all of those vibration actuators, and elastically supported by the springs to be capable of vibrating in the vibration direction. In the vibration actuator using VCM as the driving principle, a magnetic attraction force does not work under a normal state due to its magnetic circuit configuration. Therefore, mainly a metal spring is employed for elastically holding the movable part.

CITATION LIST

Patent Literature

PTL 1
Japanese Patent Application Laid-Open No. 2015-095943
PTL 2
Japanese Patent Application Laid-Open No. 2015-112013
PTL 3
Japanese Patent No. 4875133

SUMMARY OF INVENTION

Technical Problem

Recently, those vibration actuators are considered to be incorporated as an incoming notification function device or the like on a mobile terminal or a wearable terminal that are apparatuses in a form used by being worn on the bodies of users such as wrist watches, rings, or the like.

In order to generate vibration enough for the user to feel a bodily sensation with the incoming notification function device in the mobile terminal, the wearable terminal, or the like, a device with large vibrations is desired.

The conventional vibration actuators disclosed in PTLs 1 to 3 are in a configuration capable of easily increasing vibrations by being driven in a longitudinal direction inside a flat cuboid-shape casing.

When those actuators are incorporated in a wearable terminal and disposed on a mounting face such as a body surface or the like, the vibration direction becomes parallel to the mounting face. Therefore, with the vibration actuator in which the movable body drives in a parallel direction, it is hard to feel bodily sensation.

An object of the present invention is to provide a vibration actuator, a wearable terminal, and an incoming notification function device capable of reducing the size and capable of acquiring vibrations felt by the body in a fine manner.

Solution to Problem

One aspect of a vibration actuator of the present invention includes:
a fixing body including any one of a coil or a magnet;
a movable body including the other one of the coil or the magnet; and
an elastic body movably supporting the movable body with respect to the fixing body, in which:
the movable body reciprocally moves in a vibration direction with respect to the fixing body by cooperation work of the coil that is to be energized and the magnet,
the coil and the magnet are provided on the fixing body and the movable body such that the magnet is capable of being inserted into and removed from the coil in the vibration direction, and
the elastic body is a plate-like elastic body with one end being fixed to the fixing body and another end being fixed to the movable body to support the movable body with a cantilever structure to be capable of reciprocally oscillating in the vibration direction.

One aspect of a wearable terminal of the present invention includes the vibration actuator of the above configuration mounted thereon. Further, an incoming notification function device of the present invention includes the vibration actuator of the above configuration mounted thereon.

Advantageous Effects of Invention

The present invention achieves the vibration actuator capable of reducing the size, excellent in assemblability and durability, and capable of vibrating favorably.

DESCRIPTION OF EMBODIMENTS

Embodiments of the present invention will be described in detail hereinafter with reference to the accompanying drawings.

Embodiment 1

Figure 1:
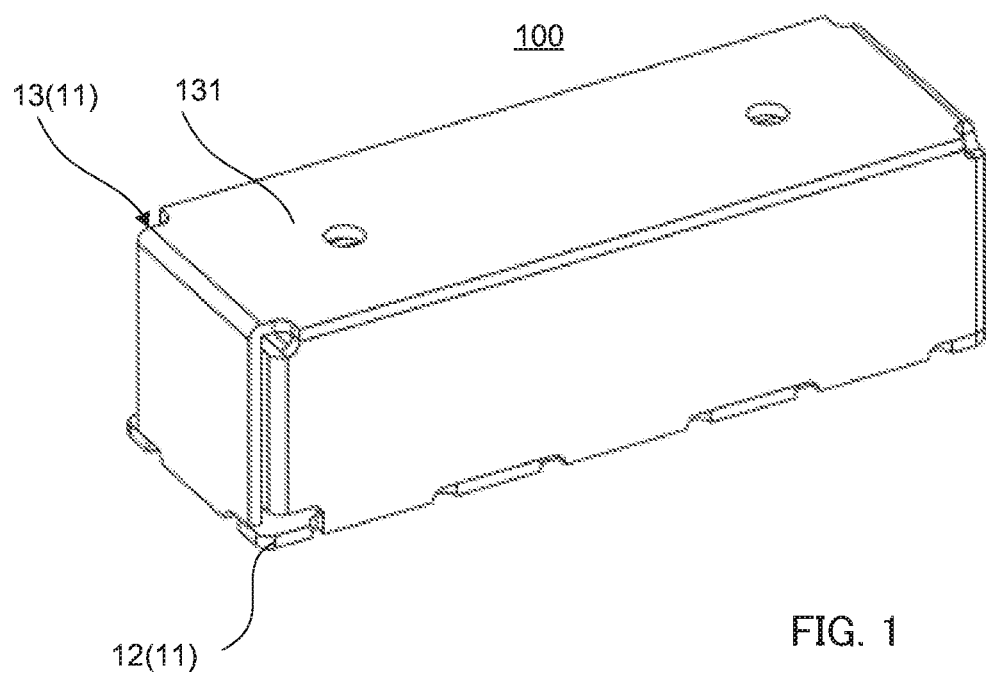
FIG. 1 is an external view illustrating a configuration of a vibration actuator according to Embodiment 1 of the present invention.
Figure 2:
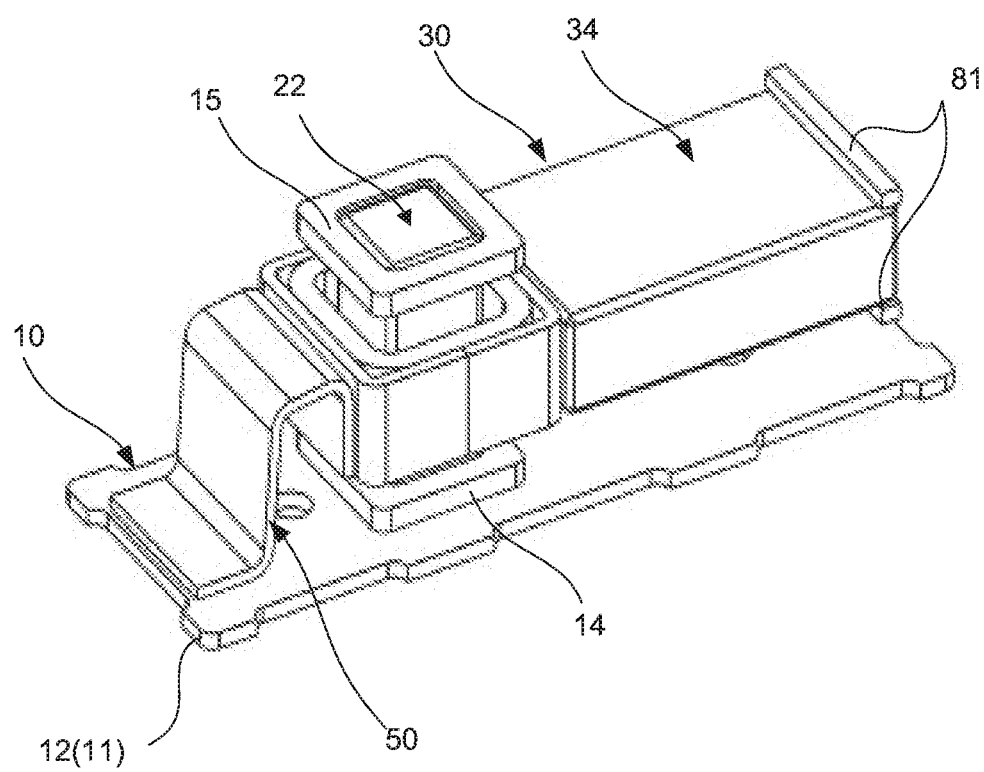
FIG. 2 is a perspective view illustrating a state where a cover is removed from the vibration actuator.
Figure 3:
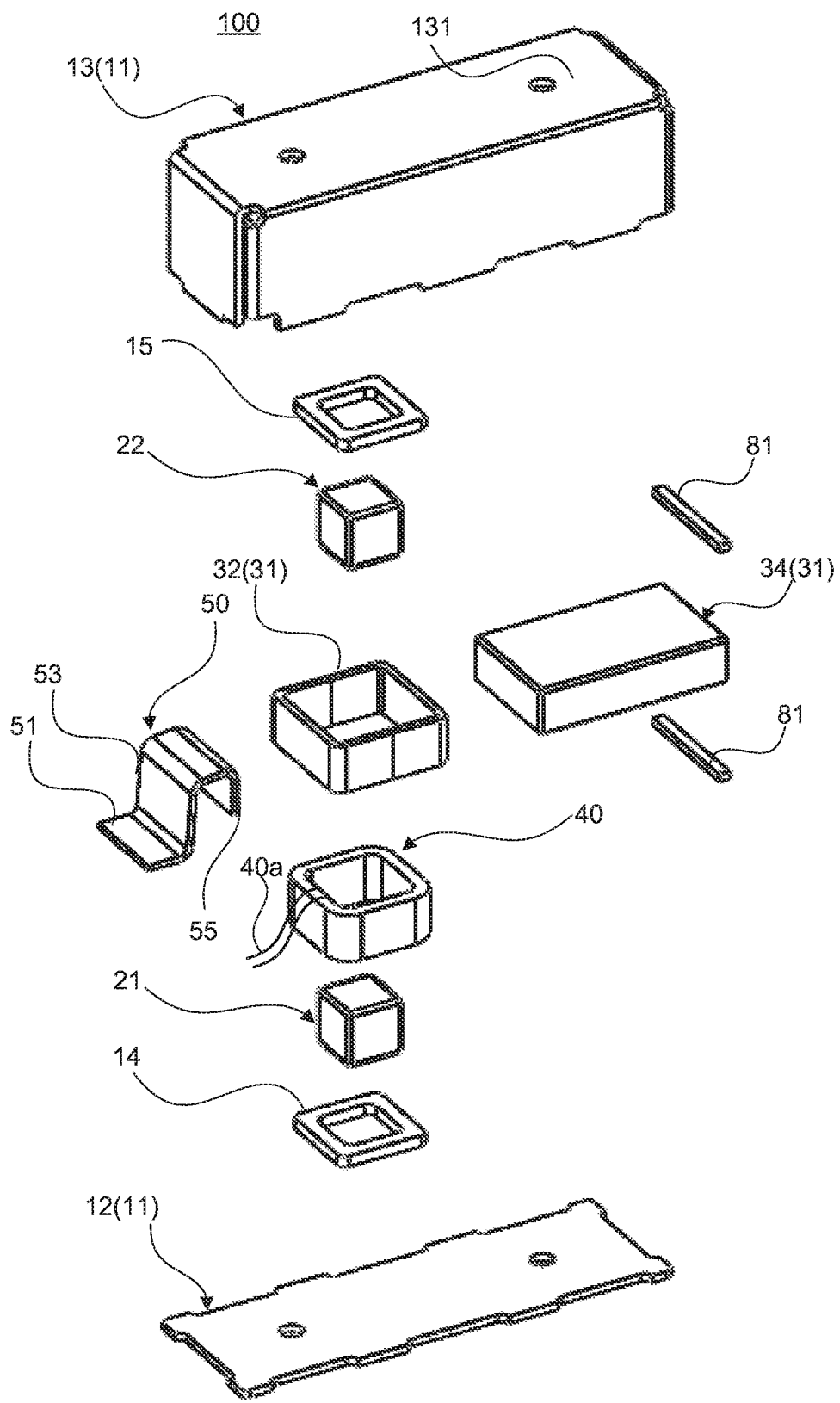
FIG. 3 is an exploded perspective view of the vibration actuator.
Figure 4:
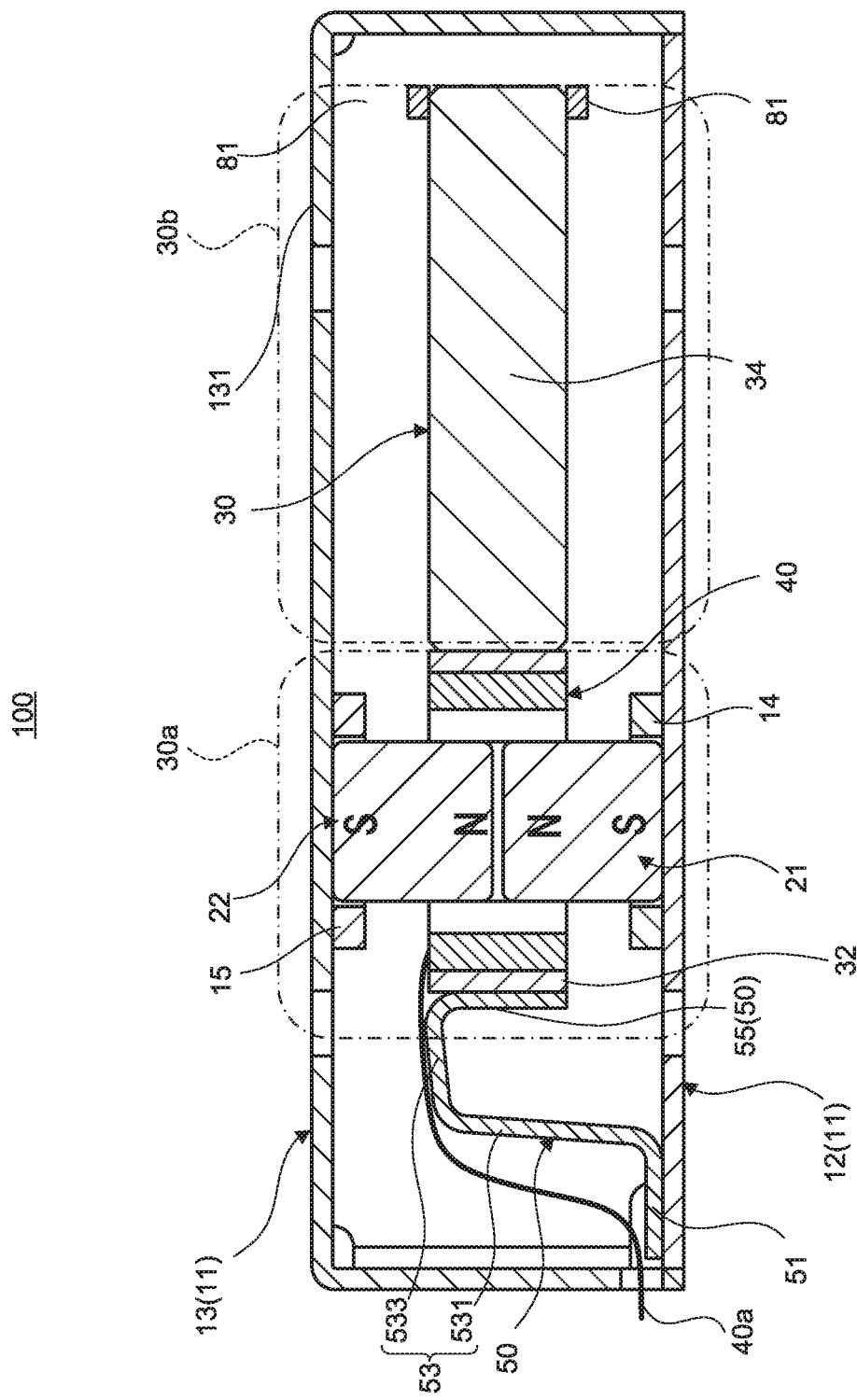
FIG. 4 is a longitudinal sectional view of the configuration of main components of the vibration actuator.
Figure 5:
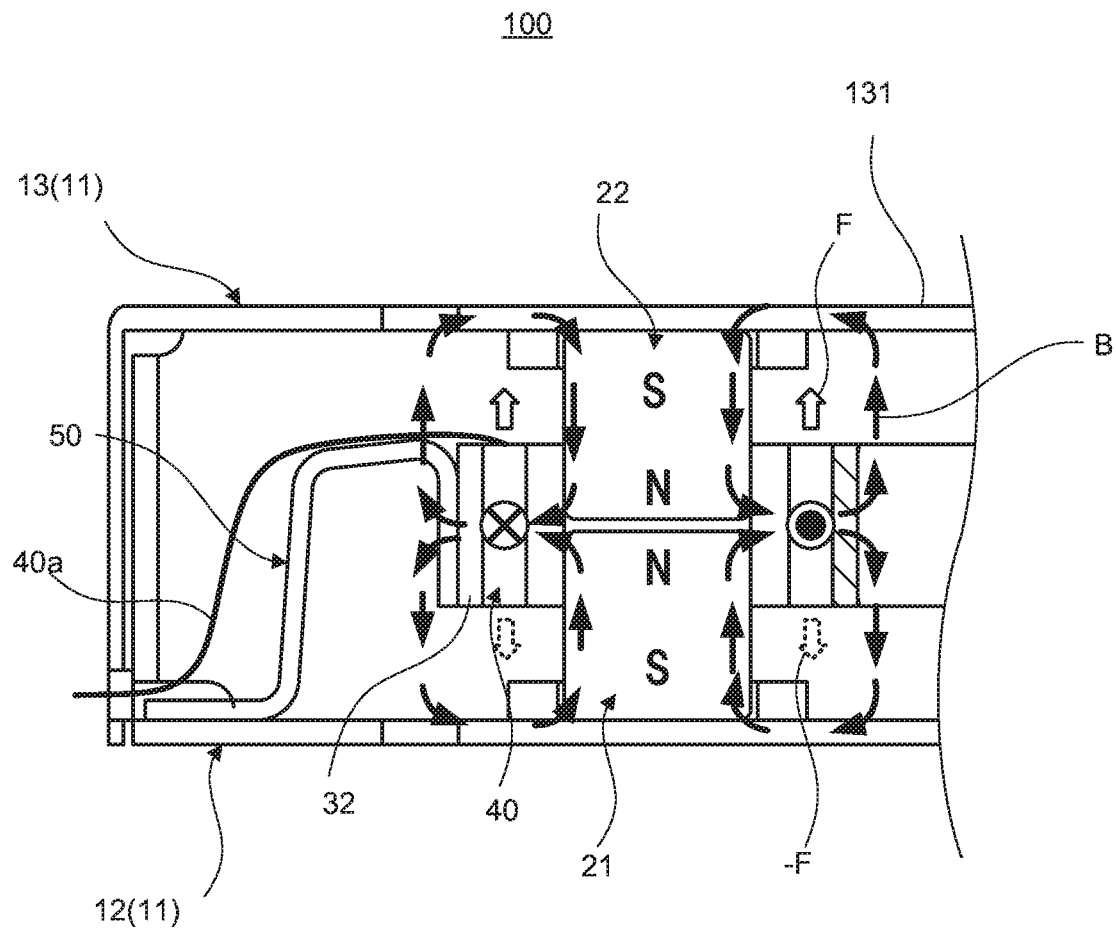
FIG. 5 is a diagram illustrating the configuration of a magnetic circuit of the vibration actuator.
Figure 6:
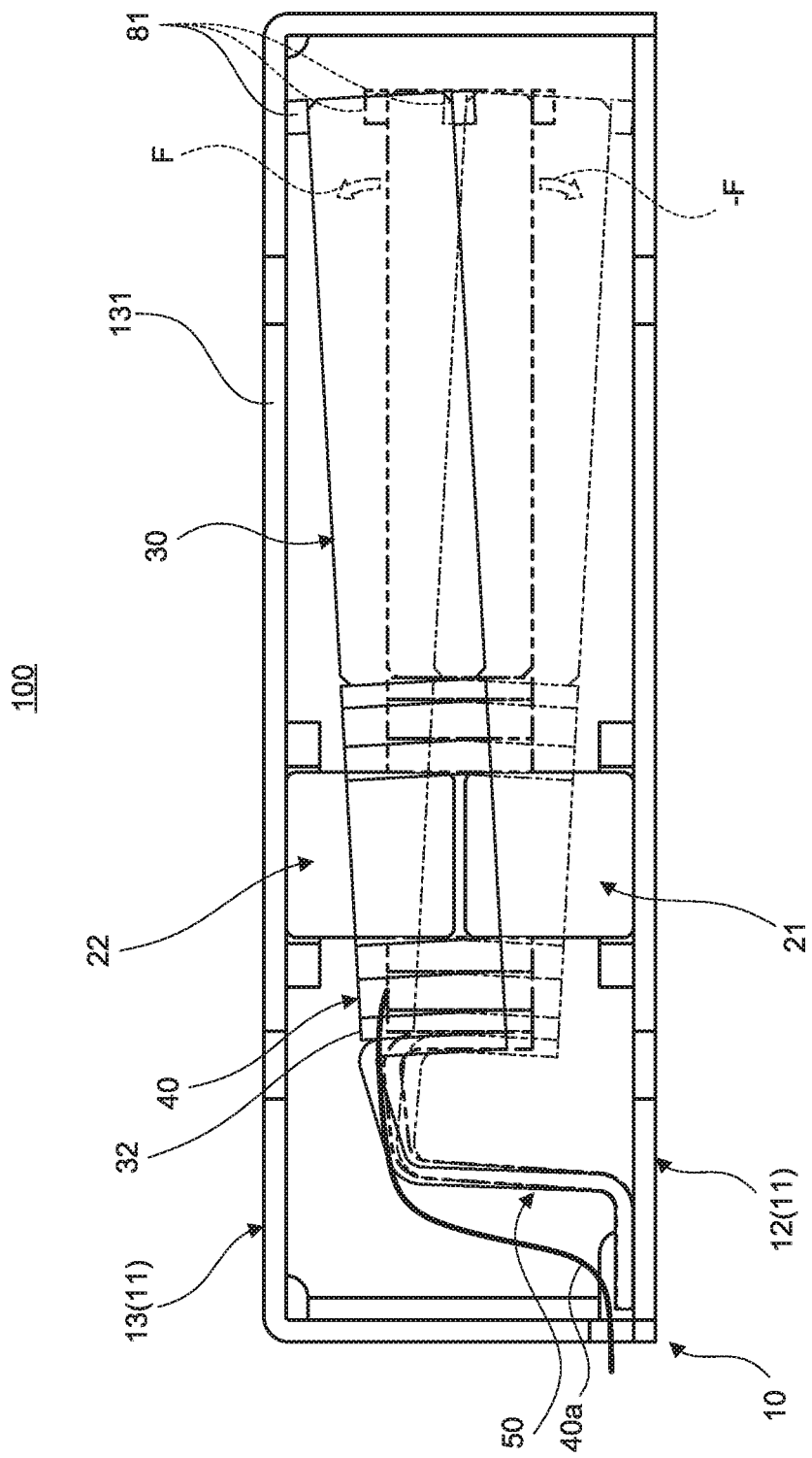
FIG. 6 is a longitudinal sectional view illustrating actions of a movable body in the vibration actuator.

FIG. 1 is an external view illustrating a configuration of a vibration actuator according to Embodiment 1 of the present invention, FIG. 2 is a perspective view illustrating a state where a cover is removed from the vibration actuator, and FIG. 3 is an exploded perspective view of the vibration actuator. Further, FIG. 4 is a longitudinal sectional view of the configuration of main components of the vibration actuator, FIG. 5 is a diagram illustrating the configuration of a magnetic circuit of the vibration actuator, and FIG. 6 is a longitudinal sectional view illustrating actions of a movable body in the vibration actuator.

Vibration actuator 100 illustrated in FIG. 1 and FIG. 2 includes casing 11 of a cuboid external shape formed with base plate 12 and cover 13. The shape of casing 11 in vibration actuator 100 of the embodiment is formed such that, among a height, a width, and a depth, the depth becomes the longest and the height becomes the shortest in any dimensions. Note that casing 11 may not be in a cuboid shape but may be in any other shapes such as a cubic shape as long as it is a shape capable of housing movable body 30 movably.

Vibration actuator 100 includes: fixing body 10 including casing 11; movable body 30 that vibrates (one end side reciprocally oscillates by having the other end side as a fulcrum) with respect to fixing body 10 inside casing 11; and plate spring part 50 as a plate-like elastic body.

In vibration actuator 100, a first end portion of movable body 30 that is disposed opposite to base plate 12 and has a second end portion supported by plate spring part 50 works as a free end and reciprocally vibrates in a height direction with respect to base plate 12.

Specifically, fixing body 10 includes base plate 12, cover 13, first magnet holder 14, second magnet holder 15, first magnet 21, and second magnet 22, and movable body 30 includes coil 40, main body part 31 (coil holder 32 and weight 34), and contact parts 81.

Base plate 12 is formed in a rectangular shape, has movable body 30 disposed on its surface side by being isolated therefrom, and forms casing 11 together with cover 13.

Base plate 12 is formed with a plate material exhibiting conductivity together with cover 13 to be described later, and functions as an electromagnetic shield.

First magnet 21 is fixed on base plate 12 via first magnet holder 14.

First magnet holder 14 positions and fixes first magnet 21 on base plate 12. First magnet holder 14 in the embodiment is formed in a flat rectangular frame shape surrounding first magnet 21, and first magnet 21 is disposed inside thereof. First magnet holder 14 in the embodiment is disposed such that first magnet 21 comes to be positioned at base-end side portion 30a of movable body 30.

While first magnet holder 14 may be formed with any materials such as metal and resin, it is preferable to be nonmagnetic so as not to give an influence on a flow of magnetic flux such as distorting distribution of the magnetic flux emitted from magnetic poles of the magnets (especially first magnet 21). First magnet holder 14 of the embodiment is formed with nonmagnetic stainless together with second magnet holder 15. Because first magnet holder 14 is nonmagnetic, it is possible at the time of assembling vibration actuator 100 to preferably dispose first magnet holder 14 at a prescribed position without being attracted to first magnet 21 and second magnet 22 so that vibration actuator 100 can be assembled easily.

First magnet 21 is fixed such that its magnetization direction becomes a perpendicular direction with respect to base plate 12. In the embodiment, first magnet 21 is formed in a rectangular shape with its S-pole being disposed on base plate 12 side and N-pole being disposed on a top face side.

First magnet 21 is inserted into coil 40 of movable body 30 along with second magnet 22.

Cover 13 is attached to cover base plate 12, and houses movable body 30 inside casing 11 that is formed together with base plate 12. Casing 11 houses movable body 30 to be freely movable.

Movable body 30 is disposed on the inner side of cover 13 to be freely movable. In the embodiment, top plate 131 of cover 13 is disposed opposite to base plate 12 with movable body 30 interposed therebetween.

Second magnet 22 located on top plate 131 by second magnet holder 15 is fixed to cover 13. Note that a part of top plate 131 where second magnet 22 is fixed and a part of base plate 12 where first magnet 21 is fixed also function as yokes.

Second magnet holder 15 is formed in the same manner as that of first magnet holder 14. In this embodiment, second magnet holder 15 is formed in a flat rectangular frame shape surrounding second magnet 22, and second magnet 22 is disposed on an inner side thereof. Second magnet holder 15 is disposed opposite to first magnet holder 14. Second magnet holder 15 locates second magnet 22 formed in the same manner as that of first magnet 21 at a position opposing to first magnet 21.

As illustrated in FIG. 4, right above first magnet 21, second magnet 22 is disposed with the magnetization direction set different from the magnetization direction of first magnet 21.

That is, second magnet 22 and first magnet 21 are disposed opposite to each other with the same magnetic polarity.

As illustrated in FIG. 4 and FIG. 5, a lower face of second magnet 22 in the embodiment is an N-pole face, and second magnet 22 is disposed with a space provided between the lower face of second magnet 22 and a top face of the N-pole of first magnet 21. Second magnet 22 is inserted into coil 40 of movable body 30 while being isolated from the inner peripheral face of coil 40.

In movable body 30, coil 40 and main body part 31 are joined side by side in a direction (front-and-back direction in FIG. 4) orthogonal to the magnetization direction of first magnet 21 and second magnet 22.

Coil 40 together with first magnet 21 and second magnet 22 generates a magnetic force to electromagnetically drive movable body 30. Coil 40 is disposed on an outer periphery side of first magnet 21 and second magnet 22 with a prescribed space provided therebetween surrounding the top face of first magnet 21 and the lower face of second magnet 22 opposing to each other.

Coil 40 has a shape fitting the external shapes of first magnet 21 and second magnet 22. Coil 40 in the embodiment is formed in a square frame shape to fit the external shape of first magnet 21 and second magnet 22, and disposed to be wound around the periphery of first magnet 21 and second magnet 22 in the direction orthogonal to the magnetization direction of first magnet 21 and second magnet 22.

That is, it is preferable for a winding axis of coil 40 to be parallel to the magnetization direction of first magnet 21 and second magnet 22 of fixing body 10. The winding axis of coil 40 in the embodiment under an undriven state overlaps with a center axis of first magnet 21 and second magnet 22, and opposes to first magnet 21 and second magnet 22 in a width direction and a depth direction with a prescribed space provided therebetween. The prescribed space herein is a space capable of allowing coil 40 to move in the thickness direction with respect to first magnet 21 and second magnet 22 and, more specifically, is a space capable of allowing coil 40 to oscillate in the thickness direction in accordance with oscillation of movable body 30.

In coil 40, a power supply part (not illustrated) is connected to coil wire 40a extruded out to the base end side from a coil wound portion. The power supply part is connected to an external power, and supplies electric power to coil 40 to generate a magnetic force.

Coil 40 is attached to main body part 31 of movable body 30 via coil holder 32.

Main body part 31 includes a first end portion to which plate spring part 50 as an elastic body is attached and a second end portion as a free end. Main body part 31 in the embodiment is configured with coil holder 32 and weight 34.

Coil holder 32 fixes movable body fixing part 55 as the second end portion of plate spring part 50 to movable body 30, and holds coil 40.

Coil holder 32 in the embodiment is formed in a rectangular frame shape to have coil 40 disposed on an inner side of the frame part, and fixes coil 40 at an outer periphery face thereof. Coil holder 32 in the embodiment is formed by processing a sheet metal made with stainless material. Note that coil holder 32 may be formed with a material of high specific gravity (specific gravity of about 16 to 19) such as tungsten that is of high specific gravity as long as it is capable of being formed into the above shape and dimensions. In such case, the mass of the movable body can be increased because of the high specific gravity.

Plate spring part 50 is fixed at one side face of coil holder 32, and weight 34 is adjacently fixed at the other side face on the opposite side of plate spring part 50. Movable body 30 carries coil 40 on one end side of movable body 30 while carrying weight 34 on the other end side.

Weight 34 is a weight provided to movable body 30 supported by plate spring part 50 as a plate-like elastic body to increase output of vibrations of movable body 30. Weight 34 in the embodiment is attached to extend in a direction orthogonal to the axis of the coil from coil holder 32 and to an inverse side of the direction where plate spring part 50 extends on fixing body 10 side.

Weight 34 is formed with a material of high specific gravity such as tungsten that is of higher specific gravity than a material such as SECC, for example. Thereby, when it is desired to increase the mass of movable body 30 whose external shape dimensions are set in design and the like, weight 34 may be formed with a high specific gravity material with the specific gravity of about 16 to 19 so that the mass for the specific gravity can be included in the mass of the movable body. As a result, the output of vibrations of movable body 30 can be increased.

Weight 34 is in a plate-like cuboid shape and, in the embodiment, formed in the same thickness as the height of coil holder 32. Thereby, upper end faces of coil holder 32 and weight 34 are flush with each other, and lower end faces thereof are flush with each other.

Contact parts 81 are attached at tip ends of weight 34 in the oscillation directions, that is, in approaching and leaving directions with respect to base plate 12 herein. Contact parts 81 oppose to each of top plate 131 and base plate 12 in the vibration directions.

Contact parts 81 are dampers (cushioning material), and abut against base plate 12 and top plate 131 of cover 13 when movable body 30 oscillates. Contact parts 81 herein are formed with a soft material such as an elastomer, rubber, resin, and a porous elastic body such as a sponge. Thereby, when coming to contact with base plate 12 or top plate 131 at the time of driving movable body 30, it is possible to ease the impact at the time of contact and reduce generation of a contact sound and a vibration noise when the impact at the time of contact is transmitted to casing 11.

Plate spring part 50 has its one end fixed to fixing body 10 and the other end fixed to movable body 30, thereby forming a cantilever structure to support movable body 30 to be reciprocally oscillatable in the vibration direction. Plate spring part 50 supports movable body 30 to be able to oscillate in a direction crossing with (herein, orthogonal to) the longitudinal direction of casing 11.

Plate spring part 50 in the embodiment is formed with a plate spring. Plate spring part 50 is formed by bending a long plate, and includes fixing body fixing part 51 to be fixed to fixing body 10, elastically deformable arm part 53, and movable body fixing part 55 to be fixed to movable body 30.

Fixing body fixing part 51 is fixed on the first end portion side of the surface of base plate 12 by bonding, welding, or the like. Arm part 53 includes rising plate part 531 extruded out from fixing body fixing part 51 to rise upward, and bending plate part 533 bent from rising plate part 531 along base plate 12. In bending plate part 533, movable body fixing part 55 is formed to suspend from a tip end of bending plate part 533 toward base plate 12 side. Movable body fixing part 55 is fixed in surface-contact with one side face of coil holder 32 by bonding, welding, or the like.

Through plate spring part 50, movable body 30 is disposed inside casing 11 at an intermediate position between base plate 12 and top plate 131 of cover 13 by being cantilevered substantially in parallel to each of base plate 12 and top plate 131.

(Actions of Vibration Actuator 100)

An external power is connected to coil 40 via a power supply part (not illustrated) that supplies electric power to coil 40.

In vibration actuator 100, movable body 30 is disposed to be oscillatable by having its one end side elastically supported by plate spring part 50 between base plate 12 of fixing body 10 and top plate 131 of cover 13. In addition, first magnet 21 and second magnet 22 are disposed in coil 40 of movable body 30, and fixed to base plate 12 and top plate 131 by having magnetic pole faces of the same polarity (N-pole faces in FIG. 5) opposed to each other.

Through supplying electric power from the power supply part to energize coil 40, movable body 30 is reciprocally vibrated in the height direction (lateral direction), that is, in approaching and leaving directions with respect to base plate 12 and top plate 131. Thereby, the second end portion of movable body 30 is oscillated.

For example, on vibration actuator 100, generated is flow B of magnetic flux illustrated in FIG. 5. When power is supplied to coil 40 in vibration actuator 100, an electric current flows in coil 40 that is disposed to be orthogonal to the magnetic flux from first magnet 21 and second magnet 22. By the Lorentz force generated thereby, thrust F is generated in coil 40 based on Fleming's left hand rule so that movable body 30 is driven in F direction. Thereby, movable body 30 is supported by plate spring part 50 on the first end portion side, so that, as illustrated in FIG. 6, the second end portion of movable body 30, that is, weight 34 side, oscillates and moves in the F direction and contacts (specifically collides) with top plate 131 of cover 13 via contact part 81.

Further, when an electric current changed to an inverse direction is supplied to coil 40 (when the flowing direction of the electric current in FIG. 5 is inversed), coil 40 returns to a reference position at the time of change, −F force is generated in coil 40 by the Lorenz force, and movable body 30 is driven in −F direction that is exactly opposite from F direction. Movable body 30 is supported by plate spring part 50 on the first end portion side, so that the second end portion of movable body 30, that is, weight 34 side oscillates and moves in −F direction and collides with base plate 12 via contact part 81 (a state of movable body 30 illustrated with a broken line).

In vibration actuator 100, coil 40 is energized by an alternating current wave input to coil 40 from the power supply part, and the Lorentz force is effectively generated to first magnet 21 on fixing body 10 side and second magnet 22. Thereby, coil 40 of movable body 30 acquires the thrust in F direction and −F direction with respect to the position to be the driving reference position (herein, the position at which the center position of coil 40 in the height direction comes on substantially the same horizontal plane with the intermediate position between the opposing magnetic pole faces of the same polarity of first magnet 21 and second magnet 22).

Thereby, coil 40 of movable body 30 reciprocally vibrates in F and −F direction along the height direction. That is, movable body 30 reciprocally vibrates with respect to fixing body 10 in an arc form in a direction orthogonal to base plate 12. This driving principle is described hereinafter.

Note that the driving principle of vibration actuator 100 according to the embodiment is achieved in all of the vibration actuators according to each of following embodiments.

In vibration actuator 100 according to the embodiment, movable body 30 vibrates at resonant frequency $f_r$ [Hz] calculated by following Expression (1) with respect to fixing body 10, where moment of inertia of movable body 30 is J [Kgm$^2$] m [kg], and spring constant in a twisting direction of plate spring part 50 is $K_{sp}$.

(Expression 1)

$$f_r = \frac{1}{2\pi}\sqrt{\frac{K_{sp}}{J}} \qquad [1]$$

$f_r$: RESONANT FREQUENCY [Hz]

J: INERTIA MOMENT [Kgm$^2$]

$K_{sp}$: SPRING CONSTANT [Nm/rad]

Vibration actuator 100 of the embodiment supplies an alternating current of a frequency nearly equivalent to resonance frequency $f_r$ of movable body 30 to coil 40 from the power supply part. Coil 40 is energized thereby, and movable body 30 can be moved efficiently.

Movable body 30 of vibration actuator 100 is in a state being supported in a spring-mass system structure supported by fixing body 10 via plate spring part 50. Therefore, when an alternating current of a frequency equivalent to resonance frequency $f_r$ of movable body 30 is supplied to coil 40, movable body 30 is driven in a highly efficient resonance state.

An equation of motion and an equation of circuit indicating the driving principle of vibration actuator 100 are presented hereinafter. Vibration actuator 100 is driven based on the equation of motion written as following Expression (2) and the equation of circuit written as following Expression (3).

(Expression 2)

$$J\frac{d_2\theta(t)}{dt_2} = K_t i(t) - K_{sp}\theta(t) - D\frac{d\theta(t)}{dt} \qquad [2]$$

J: INERTIA MOMENT [Kgm$^2$]

$\theta(t)$: ANGLE [rad]

$K_t$: TORQUE CONSTANT [Nm/A]

$i(t)$: ELECTRIC CURRENT [A]

$K_{sp}$: SPRING CONSTANT [Nm/rad]

D: DAMPING COEFFICIENT [Nm/(rad/s)]

(Expression 3)

$$e(t) = R i(t) + L\frac{di(t)}{dt} + K_e\frac{d\theta(t)}{dt} \qquad [3]$$

$e(t)$: VOLTAGE [V]

R: RESISTANCE [Ω]

L: INDUCTANCE [H]

$K_e$: BACK ELECTROMOTIVE FORCE CONSTANT [V/(rad/s)]

That is, moment of inertia J [Kgm²], rotation angle θ(t) [rad], torque constant $K_t$ [Nm/A], electric current i(t) [A], spring constant $K_{sp}$ [Nm/rad], damping coefficient D [Nm/(rad/s)], and the like in actuator 100 can be changed as appropriate within a range satisfying Expression (2). Further, electric voltage e(t) [V], resistance R [Ω], inductance L [H], and back electromotive force constant $K_e$ [V/(rad/s)] can be changed as appropriate within a range satisfying Expression (3).

As described, large output can be acquired efficiently when actuator 100 is driven at resonance frequency $f_r$ that is determined according to moment of inertia J of movable body 30 and spring constant $K_{sp}$ of plate spring part (elastic body) 50.

Conventionally, in a configuration in which a movable body is supported to be oscillatable with respect to a fixing body by using a plate spring, the plate spring is attached to be extended from an outer edge of both ends of the movable body isolated in the vibration direction toward a direction orthogonal to (direction crossing with) the vibration direction parallel to the bottom face of the fixing body. In case of such configuration, for stably oscillating the movable body, the plate spring is provided at least to extend in the direction orthogonal to the vibration direction from each of both ends for support by the fixing body. That is, in the vibration actuator in the conventional plate spring support configuration, the plate spring supporting the movable body to be oscillatable with respect to the fixing body is connected at a plurality of points with each of the fixing body and the movable body. Because of such configuration, a wider design space for the plate spring is required, so that it is difficult to reduce the size of the actuator. Further, the configuration of the plate spring becomes complicated, thereby making it harder to achieve efficient manufacture.

Meanwhile, in vibration actuator 100 of the embodiment, movable body 30 is fixed to one end of a single plate spring part 50 and fixing body 10 is fixed to the other end of plate spring part 50 to support movable body 30 to be oscillatable, that is, to be vibratable. Thereby, compared to the conventional configuration in which the plate spring part is fixed to the movable body and the fixing body at a plurality of points, the configuration and design are simpler and space can be saved, so that vibration actuator 100 itself can be reduced in size.

Further, with the conventional vibration actuator, there is a restriction in the mounting direction depending on the product shapes to be incorporated and the mounting space. For example, when the vibration actuator is incorporated in a product to be placed on the skin of a user when the user wears the product, the height of the vibration actuator with respect to the skin to be actually placed is designed to be as low as possible in terms of a feeling of wearing the product. That is, there is also a restriction of the mounting direction of the product on the excitation direction for movable body 30 by cooperation of first magnet 21, second magnet 22, and coil 40. Especially, in the vibration actuator capable of generating vibrations in the lateral direction that is the direction perpendicular to the skin as the mounting face, there is a restriction in design of the spring. Therefore, there is a restriction in securing the mass of the movable part and in the spring design space, so that it becomes difficult to achieve high output.

In this regards, every time movable body 30 of vibration actuator 100 oscillates, movable body 30 alternately contacts (specifically collides) with base plate 12 and top plate 131 of cover 13 via contact part 81 to vibrate casing 11 itself of vibration actuator 100.

Thereby, vibration actuator 100 can allow the user to feel larger vibrations than the vibrations generated by an actual excitation force applied to movable body 30 via casing 11.

Therefore, vibration actuator 100 has such an advantage that preferable vibrations can be given to the skin as the mounting target through applying the excitation force to the perpendicular direction with respect to the mounting direction of the product to be incorporated even with the vibration actuator in which the excitation direction is the lateral direction.

Further, in movable body 30, first magnet 21, second magnet 22, and coil 40 are disposed at base-end side (end side where plate spring part 50 is joined) portion 30a (see FIG. 4) of entire movable body 30, and weight 34 is disposed at tip side portion 30b of movable body 30. That is, in movable body 30, a magnetic circuit generating a driving torque of movable body 30 is disposed on an oscillation fulcrum side, and a weight is disposed on the tip side of movable body 30 where the displacement range is the greatest at the time of oscillation. Thereby, compared to the configuration in which first magnet 21, second magnet 22, and coil 40 are disposed on the tip side of movable body 30, a ratio of weight 34 occupying the tip side becomes greater. Therefore, rotation moment (mass in a rotation system) given to movable body 30 is increased, so that it is possible to achieve high output of vibrations.

Further, in vibration actuator 100, coil 40 is disposed on movable body 30, first magnet 21 and second magnet 22 are disposed on fixing body 10, and movable body 30 is driven by the Lorentz force generated according to Fleming's left hand rule. Thereby, even when the external shape dimensions of casing 11 of vibration actuator 100 are restricted, a magnetic force can be generated with a minimum space of the restricted dimensions. For example, when a coil and a core around which the coil is wound are provided in a case of the so-called magnet movable configuration in which a magnet is disposed on a movable body side, it is necessary to dispose the coil and the core to surround the magnet disposed on the movable body or to dispose the coil and the core on the movable body side of the magnet. In any of such coil and core dispositions, the layout space of the coil and the core becomes larger so that the space for the movable body becomes smaller within the casing of the restricted external shape. Therefore, the movable body becomes lighter, so that the output may be deteriorated.

Further, compared to the conventional vibration actuator that involves sliding with the fixing body for vibrating the movable body, movable body 30 vibrates without sliding with a part of fixing body 10, so that attenuation of the thrust due to the frictional resistance with the fixing body does not occur at the time of vibrations and a preferable amplitude can be acquired.

Embodiment 2

Figure 7:
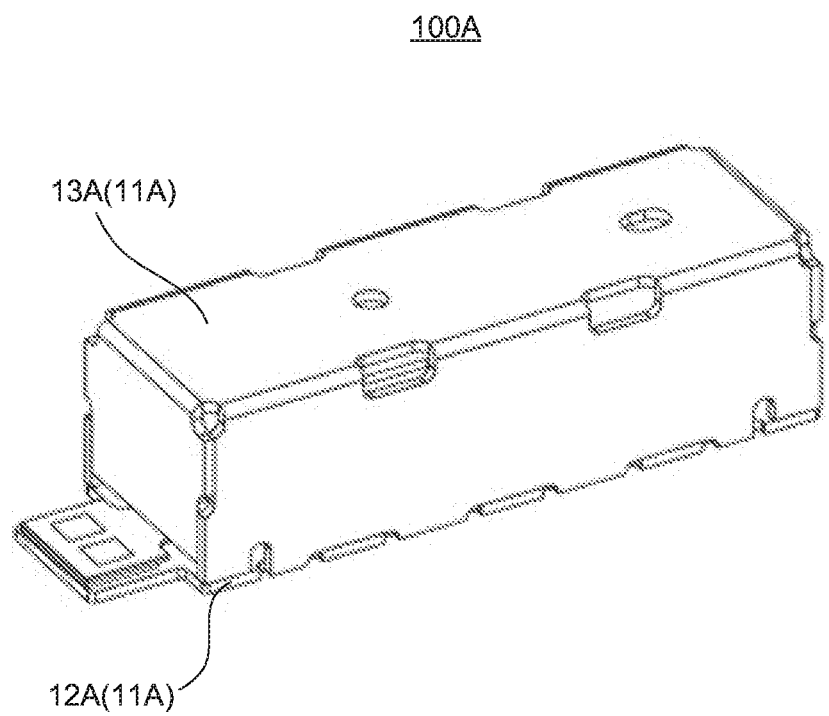
FIG. 7 is an external view illustrating a configuration of a vibration actuator according to Embodiment 2 of the present invention.
Figure 8:
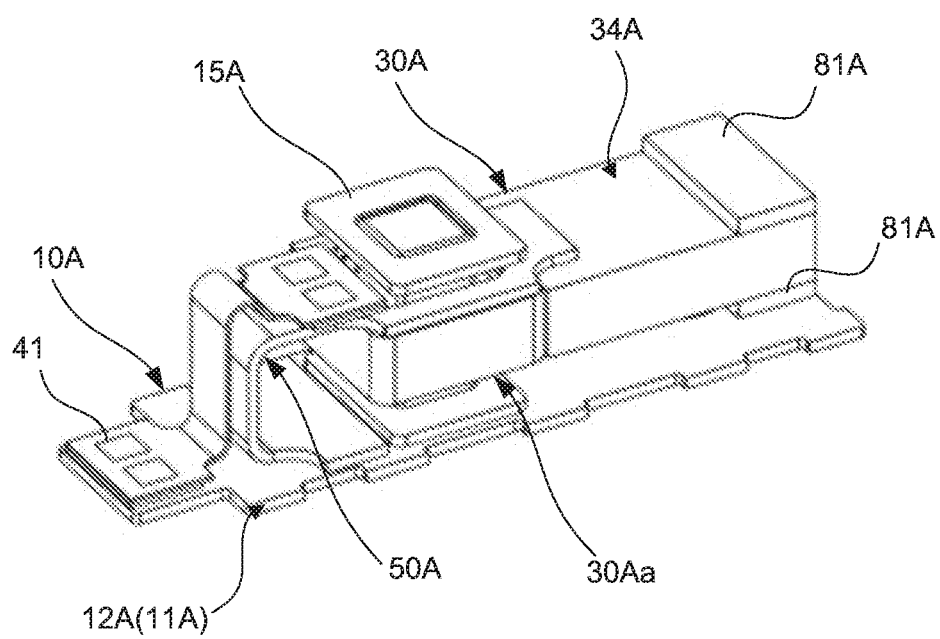
FIG. 8 is a perspective view illustrating a state where a cover is removed from the vibration actuator.
Figure 9:
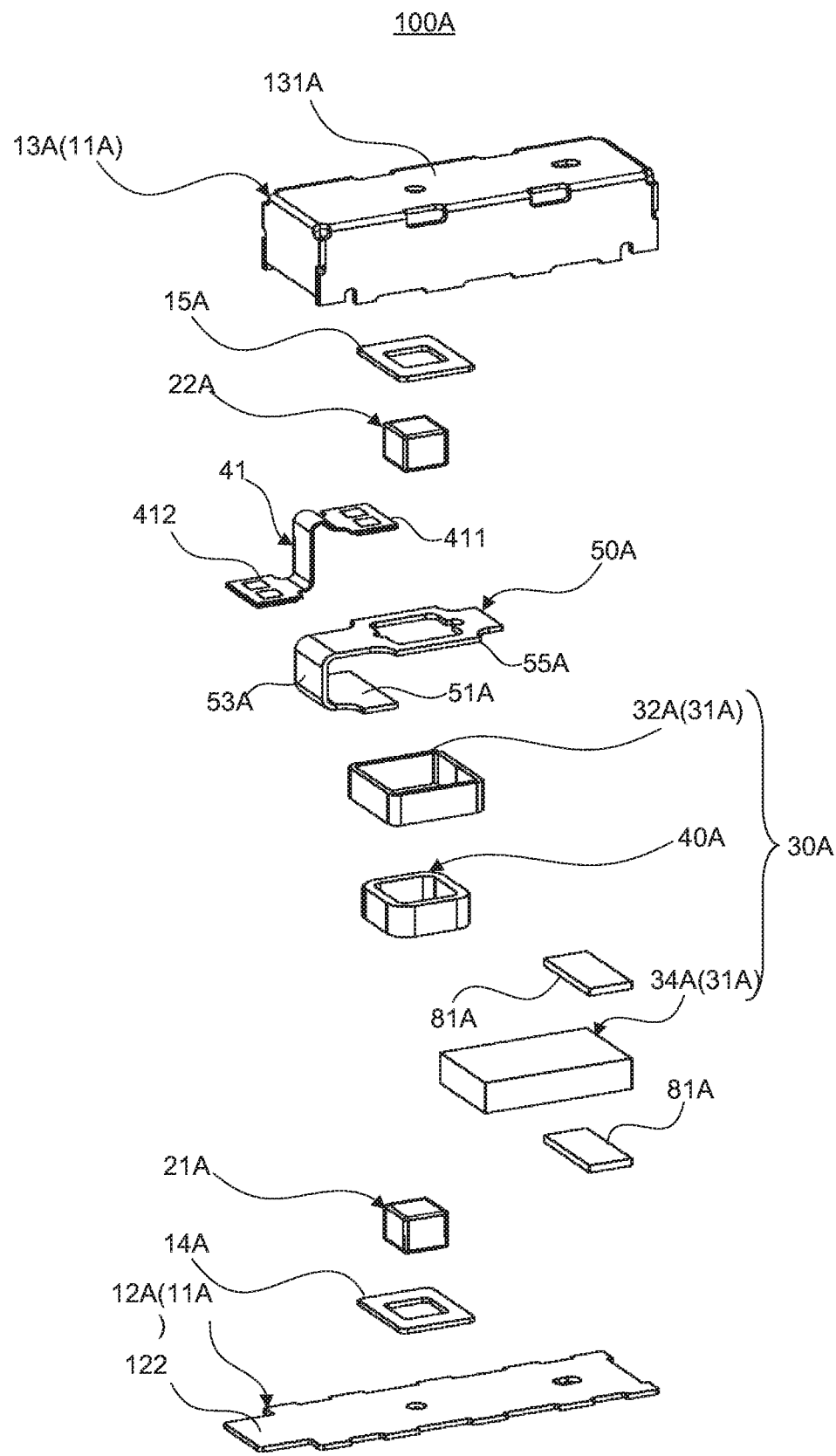
FIG. 9 is an exploded perspective view of the vibration actuator.
Figure 10:
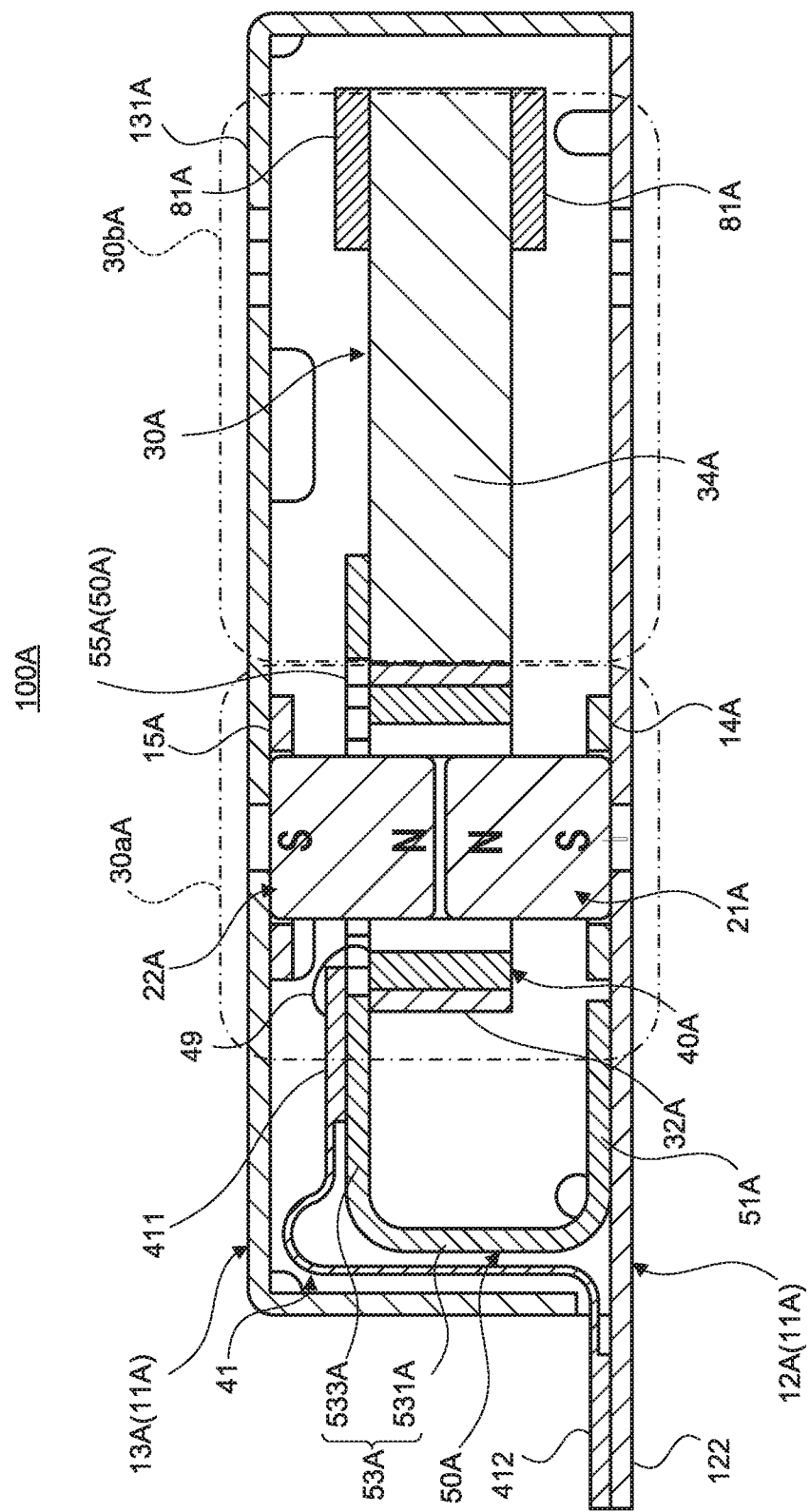
FIG. 10 is a longitudinal sectional view of the configuration of main components of the vibration actuator.
Figure 11:
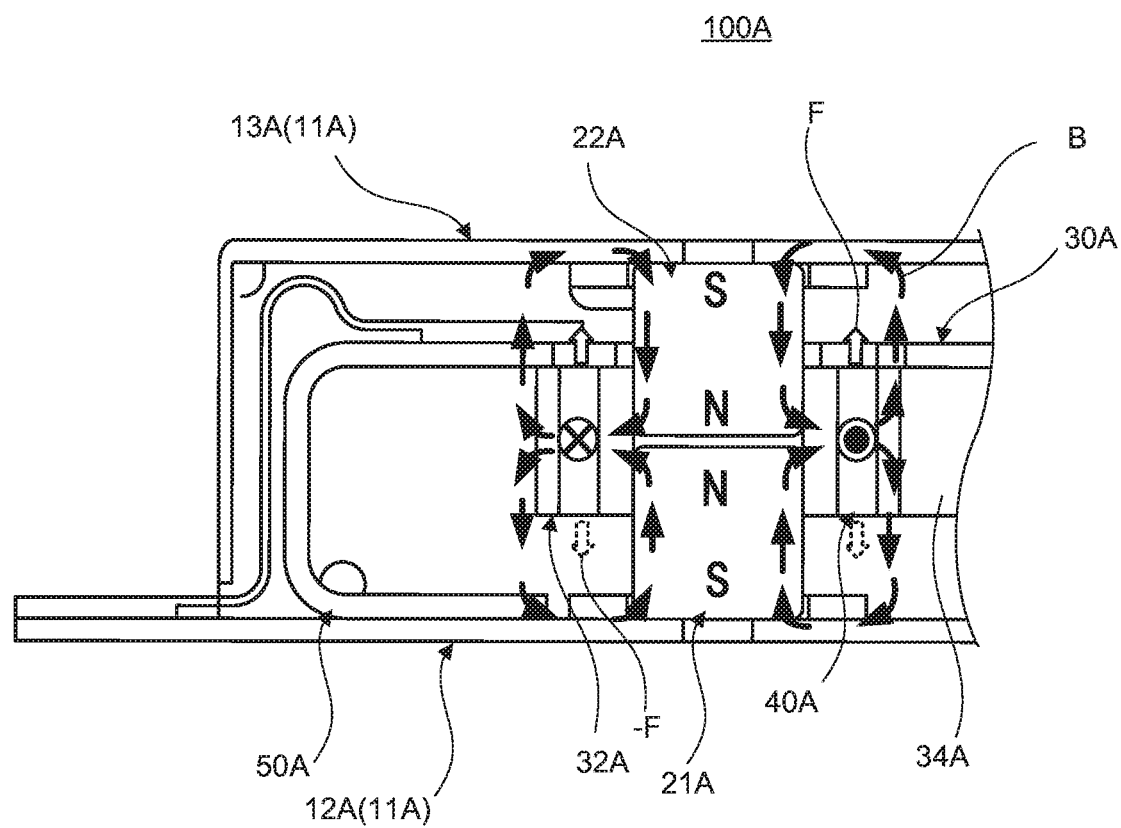
FIG. 11 is a diagram illustrating the configuration of a magnetic circuit of the vibration actuator.
Figure 12:
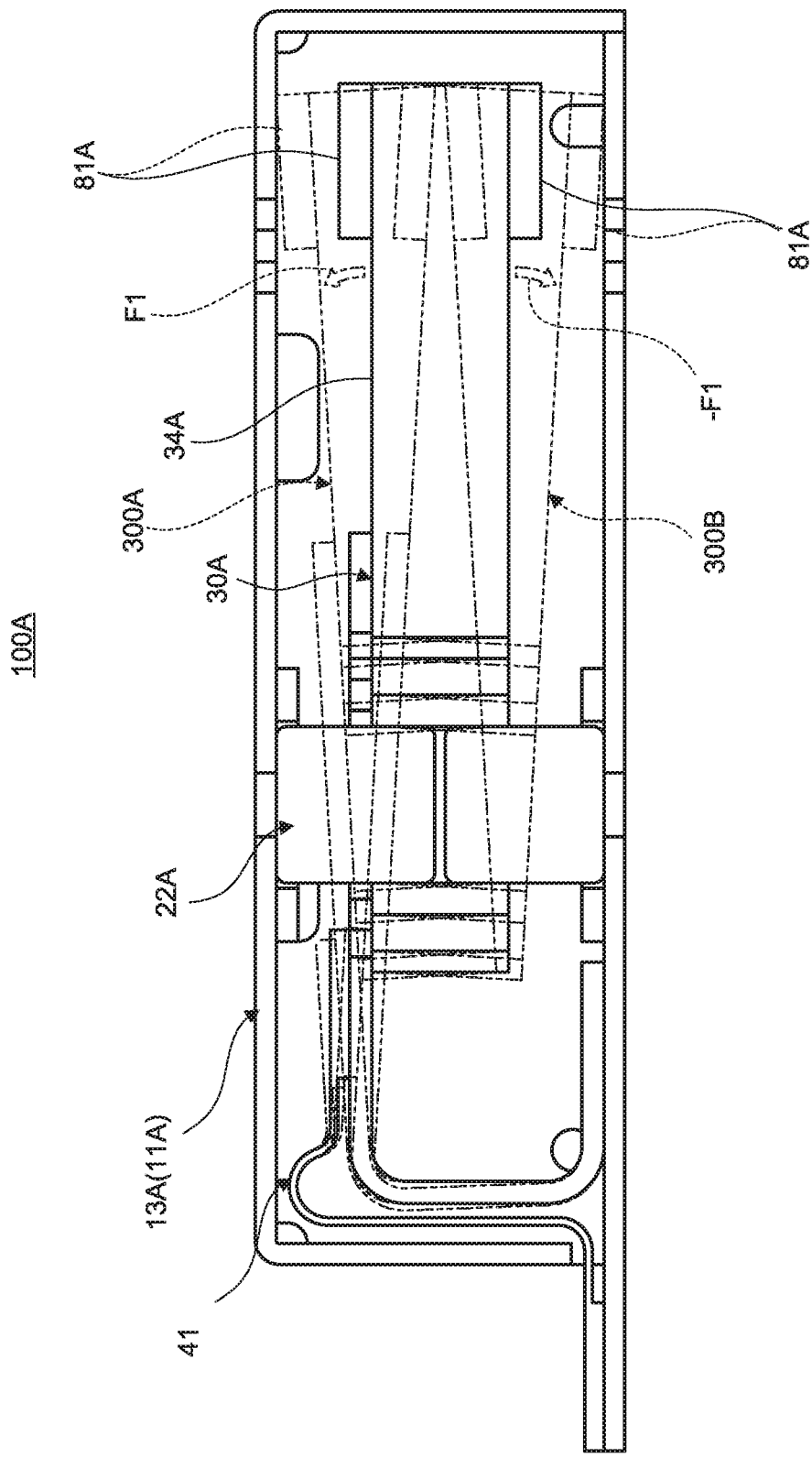
FIG. 12 is a longitudinal sectional view illustrating actions of a movable body in the vibration actuator.

FIG. 7 is an external view illustrating a configuration of a vibration actuator according to Embodiment 2 of the present invention, FIG. 8 is a perspective view illustrating a state where a cover is removed from the vibration actuator, and FIG. 9 is an exploded perspective view of the vibration actuator. FIG. 10 is a longitudinal sectional view of the configuration of main components of the vibration actuator, FIG. 11 is a diagram illustrating the configuration of a magnetic circuit of the vibration actuator, and FIG. 12 is a longitudinal sectional view illustrating actions of a movable body in the vibration actuator.

Vibration actuator 100A illustrated in FIG. 7 and FIG. 8 includes casing 11A of a cuboid external shape formed with base plate 12A and cover 13A. The shape of casing 11A in vibration actuator 100A of the embodiment is formed such that, among a height, a width, and a depth, the depth becomes the longest and the height becomes the shortest in any dimensions. Like casing 11, casing 11A may not be in a cuboid shape but may be in any other shapes such as a cubic shape as long as it is a shape capable of housing movable body 30A movably.

Vibration actuator 100A includes: fixing body 10A including casing 11A; movable body 30A that vibrates (one end side reciprocally oscillates) with respect to fixing body 10A inside casing 11A; and plate spring part 50A as a plate-like elastic body.

Note that vibration actuator 100A has similar basic configuration as that of vibration actuator 100 according to Embodiment 1, and mainly the shape of plate spring part 50A and the damper shape are different compared to those of vibration actuator 100. Hereinafter, same names and same reference numerals with "A" added thereto are applied to the same structural components as the structural components of vibration actuator 100, and description thereof is omitted as appropriate.

In vibration actuator 100A, a second end portion of movable body 30A facing base plate 12A supported by plate spring part 50A on the first end portion reciprocally vibrates in the height direction with respect to base plate 12A.

Specifically, fixing body 10A includes base plate 12A, cover 13A, first magnet holder 14A, second magnet holder 15A, first magnet 21A, and second magnet 22A. Movable body 30A includes coil 40A, main body part 31A (coil holder 32A and weight 34A), and contact parts 81A, and movable body 30A is provided to be freely oscillatable to fixing body 10A via plate spring part 50A provided between fixing body 10A and movable body 30A.

Base plate 12A is formed in a rectangular shape, has movable body 30A disposed on its surface side by being isolated therefrom, and configures hollow casing 11A together with cover 13A. First end portion 122 of base plate 12A according to the embodiment is projected to outside from casing 11A, and a second end portion of power supply part 41 connected on one end side to coil 40A inside casing 11A is disposed thereon. Power supply part 41 is a substrate supplying the electric power to coil 40A, and formed with a substrate such as a flexible printed circuit (FPC) connected to an external power via the second end portion exposed to outside casing 11A.

Base plate 12A is formed with a plate material along with cover 13A to be described later, and functions as an electromagnetic shield.

First magnet 21A is fixed on base plate 12A via first magnet holder 14A.

First magnet holder 14A has a similar function as first magnet holder 14 of actuator 100, and locates and fixes first magnet 21A on base plate 12A. First magnet holder 14A in the embodiment is formed in a flat rectangular frame shape surrounding first magnet 21A, and first magnet 21A is disposed inside thereof. First magnet holder 14A in the embodiment is disposed such that first magnet 21A comes to be positioned on base-end portion 30Aa side of movable body 30A. First magnet 21A formed in the manner described above is inserted into coil 40A of movable body 30A like first magnet 21 of actuator 100 according to Embodiment 1.

Cover 13A together with base plate 12A has a function similar to that of cover 13 and base plate 12 of actuator 100 according to Embodiment 1. Cover 13A is attached to cover base plate 12A, and houses movable body 30A to be freely movable inside casing 11A that is formed together with base plate 12A. Top plate 131A of cover 13A is disposed by opposing to base plate 12A with movable body 30A interposed therebetween.

Second magnet 22A located by second magnet holder 15A is fixed to top plate 131A of cover 13A. Note that the function of top plate 131A as a yoke is similar to that of top plate 131.

Like second magnet holder 15 of actuator 100, second magnet holder 15A locates second magnet 22A formed in the same manner as that of first magnet 21A at a position opposing to first magnet 21A.

Like second magnet 22 of actuator 100, as illustrated in FIG. 10 and FIG. 11, second magnet 22A is disposed opposingly right above first magnet 21A and with a space provided therebetween with the magnetization direction set different from the magnetization direction of first magnet 21A. That is, second magnet 22A is disposed opposite to first magnet 21A with the same magnetic polarity. Further, in the embodiment, an opposing part of second magnet 22A and first magnet 21A is inserted into coil 40A of movable body 30A while being isolated from inner peripheral face of coil 40A.

Compared to movable body 30, movable body 30A is different mainly in plate spring part 50A, the attaching structure of plate spring part 50A, and contact parts 81A. That is, in movable body 30A, coil 40A and main body part 31A are joined side by side in a direction (front-and-back direction in FIG. 10) orthogonal to the magnetization direction of first magnet 21A and second magnet 22A.

Coil 40A together with first magnet 21A and second magnet 22A generates a magnetic force to electromagnetically drive movable body 30A. Coil 40A is disposed on an outer periphery side of first magnet 21A and second magnet 22A with a prescribed space provided therebetween surrounding the top face of first magnet 21A and the lower face of second magnet 22A opposing to each other.

Like coil 40 of actuator 100, coil 40A has a shape fitting external shapes of first magnet 21A and second magnet 22A, and disposed to be wound around the periphery of first magnet 21A and second magnet 22A in the direction orthogonal to the magnetization direction of first magnet 21A and second magnet 22A. The positional relation of coil 40A, first magnet 21A, and second magnet 22A is similar to that of Embodiment 1, so that description thereof is omitted.

Power supply part 41 is connected to coil 40A. Coil 40A is attached to main body part 31A of movable body 30A via coil holder 32A.

Power supply part 41 is a substrate supplying the electric power to coil 40A. Power supply part 41 herein is a flexible printed circuit (FPC). In the embodiment, power supply part 41 is disposed such that a flexible part overlaps on an upper side of plate spring part 50A on a base end side of movable body 30. First end portion 411 on one side of the flexible part is connected to coil 40A via wire 49 on movable body 30A side. Second end portion 412 on the other side of the flexible part of power supply part 41 is provided on first end portion 122 of base plate 12A, and exposed to outside of casing 11A in the longitudinal direction. Note that a drive circuit may be mounted on power supply part 41, and an electric power supplied from an external power source connected outside is supplied to coil 40A to generate a magnetic force. Power supply part 41 follows move of movable body 30 at the flexible part.

Main body part 31A includes a first end portion to which plate spring part 50A as an elastic body is attached and a second end portion as a free end. Main body part 31A in the embodiment is configured with coil holder 32A and weight 34A.

Coil holder 32A fixes movable body fixing part 55A as the second end portion of plate spring part 50A to movable body 30A, and holds coil 40A.

Coil holder 32A in the embodiment is formed in a rectangular frame shape to have coil 40A disposed on an inner side of the frame part, and fixes coil 40A at an outer periphery face thereof. Like coil holder 32 of Embodiment 1, coil holder 32A is formed by processing a sheet metal made with stainless material. Like coil holder 32, coil holder 32A may be formed with a material of high specific gravity (specific gravity of about 16 to 19) such as tungsten that is of high specific gravity as long as it is capable of being formed into the above shape and dimensions. In such case, the mass of the movable body can be increased because of the high specific gravity.

Movable body fixing part 55A of plate spring part 50A is fixed at an upper end face of coil holder 32A, and weight 34A is adjacently fixed at the other side face on the opposite side of the side where plate spring part 50A is extruded. Movable body 30A carries coil 40A on one end side of movable body 30A while carrying weight 34A on the other end side.

Like weight 34, weight 34A is a weight provided to movable body 30A supported by plate spring part 50A as a plate-like elastic body to increase output of vibrations of movable body 30A. Weight 34A in the embodiment is attached to extend in a direction orthogonal to the axis of the coil from coil holder 32A and to an inverse side of the direction where plate spring part 50A extends on fixing body 10A side.

Weight 34A is formed with a material of high specific gravity such as tungsten that is of higher specific gravity than a material such as SECC. Thereby, when it is desired to increase the mass of movable body 30A whose external shape dimensions are set in design and the like, weight 34A may be formed with a high specific gravity material with the specific gravity of about 16 to 19 so that the mass for the specific gravity can be included in the mass of the movable body. As a result, the output of vibrations of movable body 30A can be increased.

Weight 34A is in a plate-like cuboid shape and, in the embodiment, formed in the same thickness as the height of coil holder 32A. Thereby, upper end faces of coil holder 32A and weight 34A are flush with each other, and lower end faces thereof are flush with each other.

Contact parts 81A are attached at tip ends (top and bottom faces of tip end) of weight 34A in the oscillation directions, that is, in approaching and leaving directions with respect to base plate 12A and top plate 131A herein by opposing to base plate 12A and top plate 131A.

Contact parts 81A are dampers, and abut against base plate 12A and top plate 131A of cover 13A when movable body 30A oscillates.

Plate spring part 50A is formed with a plate-like elastic body and, in the embodiment, formed with a plate spring. Plate spring part 50A is formed to have a substantially U-shape in sectional view such that one end to be fixed to fixing body 10A and the other end to be fixed to movable body 30 are isolated and opposed to each other.

Plate spring part 50A in the embodiment is formed by bending a long plate into a U-shape, and includes fixing body fixing part 51A to be fixed to fixing body 10A, elastically deformable arm part 53A, and movable body fixing part 55A to be fixed to movable body 30A.

As illustrated in FIG. 10, fixing body fixing part 51A is fixed on the first end portion side of the surface of base plate 12A by bonding, welding, or the like inside cover 13A. Arm part 53A includes rising plate part 531A extruded out to rise upward from the base end side of actuator 100A at fixing body fixing part 51A, and bending plate part 533A bent from rising plate part 531A to the tip side of actuator 100A along base plate 12A. Movable body fixing part 55A is formed on a same plane with bending plate part 533A continuously from the tip of bending plate part 533A. At least one of bending plate part 533A and movable body fixing part 55A opposes to fixing body fixing part 51A.

Movable body fixing part 55A is formed in a frame shape fitting the shape of coil holder 32A, and disposed opposite to fixing body fixing part 51A. Movable body fixing part 55A comes in surface-contact with the upper end face of the frame shape of coil holder 32A and fixed by bonding, welding, or the like. Inside frame-shaped movable body fixing part 55A, second magnet 22A to be inserted into the inner side of coil 40A fixed to coil holder 32A is inserted and removed.

Through plate spring part 50A, movable body 30A is disposed inside casing 11A at an intermediate position between base plate 12A and top plate 131A of cover 13A by being cantilevered substantially in parallel to each of base plate 12A and top plate 131A.

That is, in plate spring part 50A of the embodiment, fixing body fixing part MA and at least one of bending plate part 533A and movable body fixing part 55A are disposed opposite to each other in parallel. Thereby, when attaching plate spring part 50A to fixing body 10A, it is unnecessary to secure the space for placing plate spring part 50A itself in the longitudinal direction of actuator 100A, that is, in the front-and-back direction. Therefore, more reduction in the size of actuator 100A itself can be achieved without decreasing the driving performance.

In vibration actuator 100A of Embodiment 2 as described above, movable body 30A is disposed to be oscillatable by having its one end side elastically supported by plate spring part 50A between base plate 12A of fixing body 10A and top plate 131A of cover 13A. In addition, first magnet 21A and second magnet 22A are disposed in coil 40A of movable body 30A, and fixed to base plate 12A and top plate 131A by having magnetic pole faces of the same polarity (N-pole faces in FIG. 11) opposed to each other.

(Actions of Vibration Actuator 100A)

Vibration actuator 100A includes a magnetic circuit similar to that of vibration actuator 100 for electromagnetical driving similar to vibration actuator 100.

Through supplying electric power from the power supply part to energize coil 40A, movable body 30A is reciprocally vibrated in the height direction (lateral direction), that is, in approaching and leaving directions with respect to base plate 12A. Thereby, a second end portion of movable body 30A is oscillated.

For example, on vibration actuator 100A, generated is flow B of magnetic flux illustrated in FIG. 11. When power is supplied to coil 40A in vibration actuator 100A, an electric current flows in coil 40A that is disposed to be orthogonal to the magnetic flux from first magnet 21A and second magnet 22A. By the Lorentz force generated thereby, thrust F is generated in coil 40A based on Fleming's left hand rule so that movable body 30A is driven in F direction. Thereby, movable body 30A is supported by plate spring part 50A on the first end portion side, so that, like movable body 300A illustrated in FIG. 12 with a broken line, the second end portion of movable body 30A, that is, weight 34A side, oscillates with one end side as the fulcrum (herein, oscillates in F1 direction). Thereby, movable body 30A comes in a state illustrated with broken line 300A, and contacts (specifically collides) with top plate 131A of cover 13A via contact part 81A.

Further, when an electric current changed to an inverse direction is supplied to coil 40A (when the flowing direction of the electric current in FIG. 11 is inversed), coil 40A returns to the reference position at the time of change, −F thrust is generated in coil 40A by the Lorenz force, and movable body 30A is driven to move in −F1 direction that is exactly opposite from F1 direction. Movable body 30A is supported by plate spring part 50A at its one end side, so that the other end of movable body 30A, that is, weight 34A side oscillates (moves in −F1 direction) and collides with base plate 12A via contact part 81A (a state of movable body 300B illustrated in FIG. 12 with a broken line).

That is, in vibration actuator 100A, coil 40A is energized by an alternating current wave input to coil 40A from power supply part 41, and a magnetic attraction force and a repulsive force are effectively generated to first magnet 21A on fixing body 10A side and second magnet 22A. Thereby, coil 40A on movable body 30A side acquires the thrust in F direction and −F direction with respect to the position to be the driving reference position (herein, the position at which the center position of coil 40A in the height direction comes on substantially the same horizontal plane with the intermediate position between the opposing magnetic pole faces of the same polarity of first magnet 21A and second magnet 22A) (see FIG. 11). Coil 40A of movable body 30A reciprocally vibrates in F direction and −F direction along the height direction. That is, movable body 30A reciprocally vibrates with respect to fixing body 10A in an arc form in a direction orthogonal to base plate 12A. This driving principle is the same as that of actuator 100 according to Embodiment 1 and achieved by Expression (1) to (3) described above, so that description thereof is omitted.

With the embodiment, effects similar to those of actuator 100 according to Embodiment 1 can be acquired.

Especially, in vibration actuator 100A, movable body 30A is fixed to one end of a single plate spring part 50A and fixing body 10A is fixed to the other end of plate spring part 50A to support movable body 30A to be oscillatable, that is, to be vibratable. Thereby, compared to the conventional configuration in which the plate spring part is fixed to the movable body and the fixing body at a plurality of points, the configuration and design are simpler and space can be saved, so that vibration actuator 100A itself can be reduced in size.

Further, every time movable body 30A of vibration actuator 100A oscillates, movable body 30A is brought in contact (specifically to collide) alternately with base plate 12A and top plate 131A of cover 13A via contact parts 81A to vibrate casing 11A itself of vibration actuator 100A.

Thereby, vibration actuator 100A can allow the user to feel larger vibrations than the vibrations generated by an actual excitation force applied to movable body 30A via casing 11A. Therefore, vibration actuator 100A has such an advantage that preferable vibrations can be given to the skin as the mounting target through applying the excitation force to the perpendicular direction with respect to the mounting direction of the product to be incorporated even with the vibration actuator in which the excitation direction is the lateral direction.

Further, like vibration actuator 100, in movable body 30A of vibration actuator 100A, first magnet 21A, second magnet 22A, and coil 40A are disposed at base-end side (end side where plate spring part 50A is joined) portion 30aA (see FIG. 10) of entire movable body 30A. First and second magnets 21A, 22A and coil 40A form a magnetic circuit as an electromagnetic driving section that generates the driving torque of movable body 30A. Weight 34A is disposed at tip side portion 30bA of movable body 30A. Thereby, compared to the configuration in which first magnet 21A, second magnet 22A, and coil 40A are disposed on the tip side of movable body 30A, rotation moment (mass in a rotation system) given to movable body 30A is increased. Therefore, it is possible to achieve high output of vibrations.

Further, like vibration actuator 100, even when the external shape dimensions of casing 11A of vibration actuator 100A are restricted, a magnetic force can be generated with a minimum space of the restricted dimensions. Meanwhile, a ratio of weight 34A occupying the tip side becomes greater in movable body 30A and rotation moment is increased, so that it is possible to achieve high output. Further, there is no attenuation of the thrust generated due to the frictional resistance with the fixing body at the time of vibration, so that it is possible to acquire a preferable amplitude.

In addition, in actuator 100A, plate spring part 50A is formed in a U-shape. That is, in plate spring part 50A, fixing body fixing part 51A is disposed on a side closer to movable body fixing part 55A than arm part 53A between movable body fixing part 55A and fixing body fixing part 51A and fixed to base plate 12A. Thereby, length of a vibration generation system of base plate 12A, plate spring part 50A, and movable body 30A in the longitudinal direction can be shortened compared to the configuration in which fixing body fixing part 51A is disposed on a side closer to the base end than arm part 53A.

Embodiment 3

Figure 13:
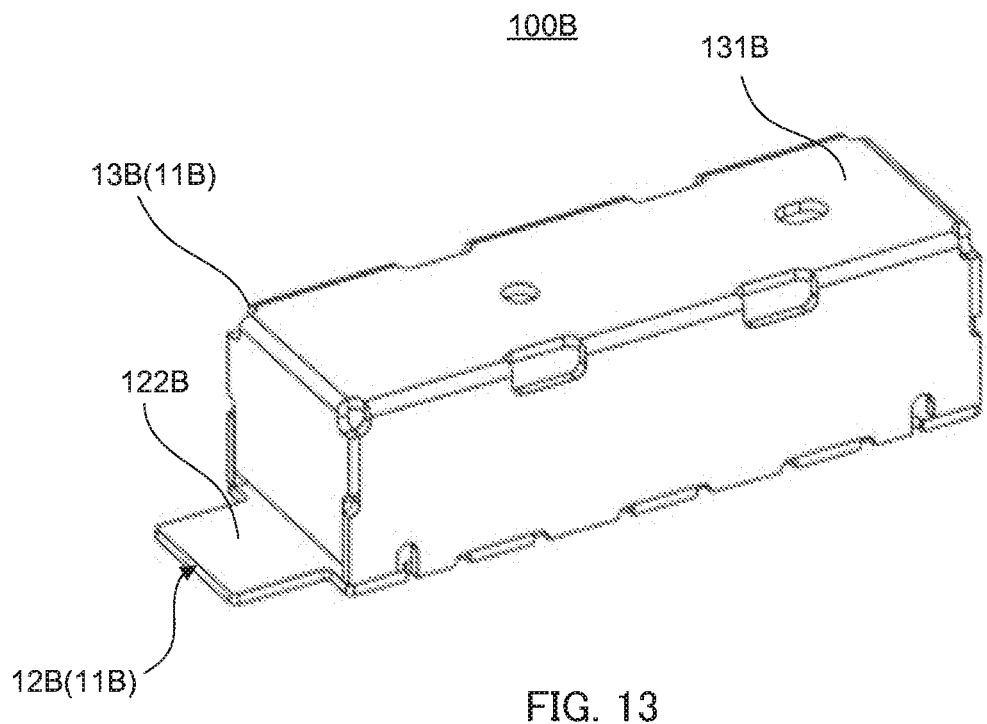
FIG. 13 is an external view illustrating a configuration of a vibration actuator according to Embodiment 3 of the present invention.
Figure 14:
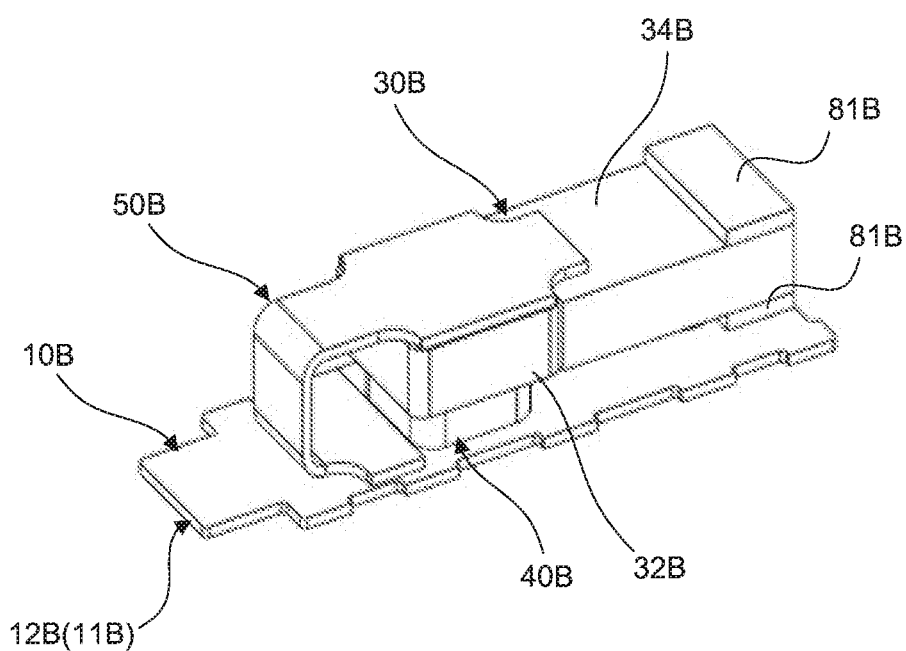
FIG. 14 is a perspective view illustrating a state where a cover is removed from the vibration actuator.
Figure 15:
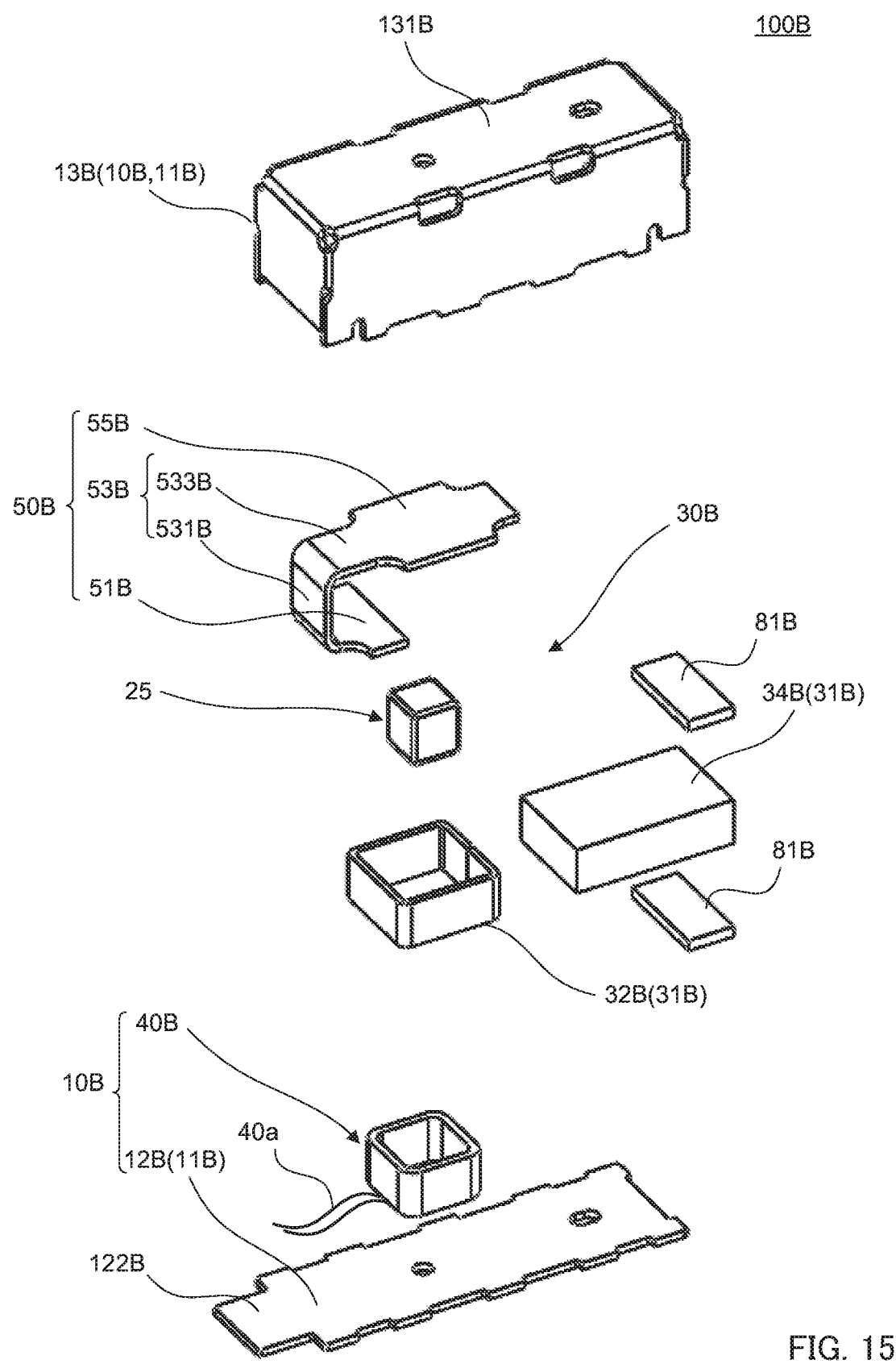
FIG. 15 is an exploded perspective view of the vibration actuator.
Figure 16:
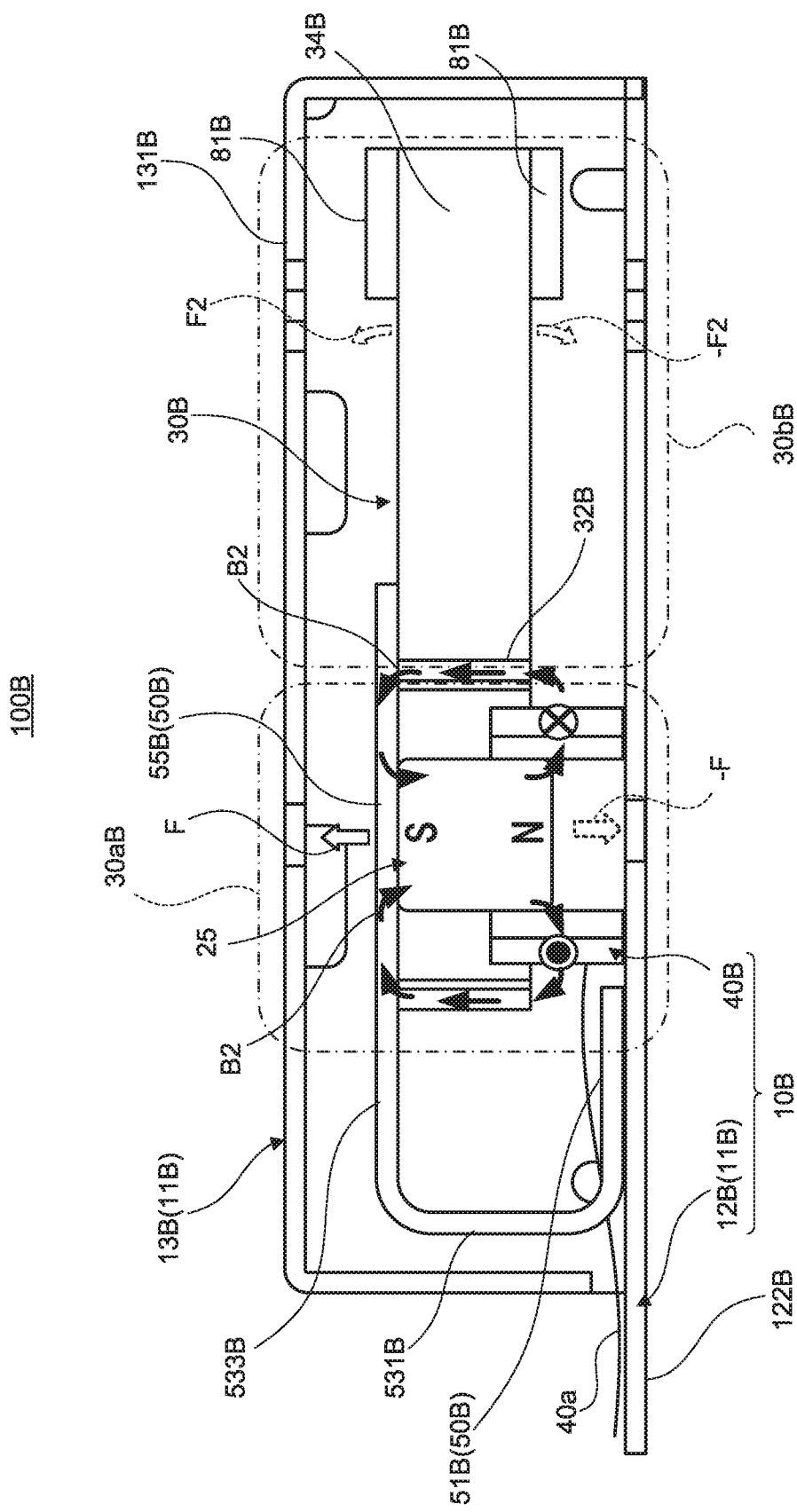
FIG. 16 is a longitudinal sectional view of the configuration of main components of the vibration actuator.
Figure 17:
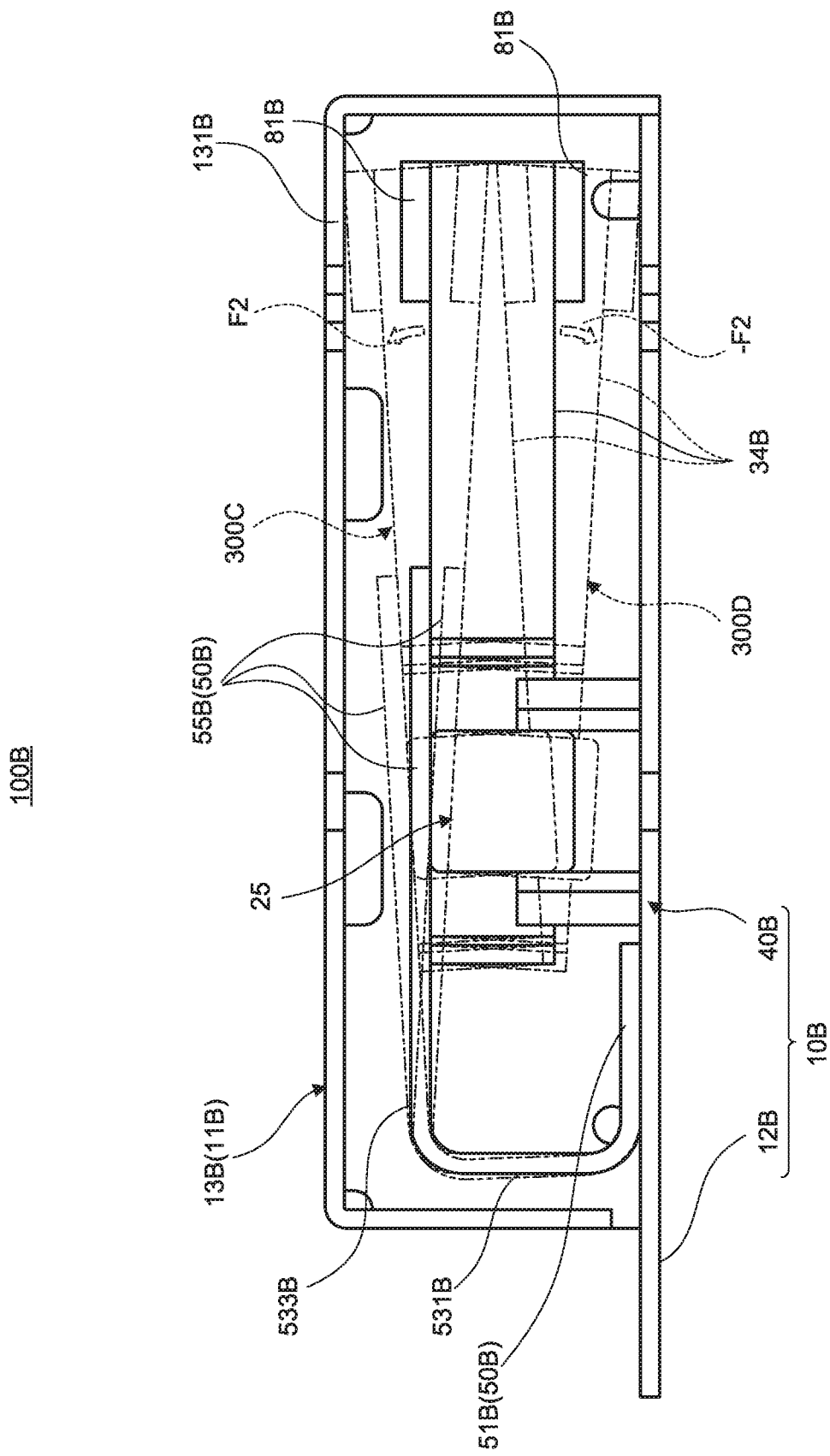
FIG. 17 is a longitudinal sectional view illustrating actions of a movable body in the vibration actuator.

FIG. 13 is an external view illustrating a configuration of a vibration actuator according to Embodiment 3 of the present invention, FIG. 14 is a perspective view illustrating a state where a cover is removed from the vibration actuator, and FIG. 15 is an exploded perspective view of the vibration actuator. Further, FIG. 16 is a longitudinal sectional view of the configuration of main components of the vibration actuator, and FIG. 17 is a longitudinal sectional view illustrating actions of a movable body in the vibration actuator.

Differences in the basic configuration of actuator 100B according to Embodiment 3 illustrated in FIG. 13 to FIG. 17 with respect to actuators 100 and 100A are that coil 40B is provided to fixing body 10B, and magnet 25 is provided to movable body 30B.

Vibration actuator 100B has the basic configuration similar to that of vibration actuator 100 of Embodiment 1, and mainly coil 40B, the shape of plate spring part 50B, and the damper shape are different compared to vibration actuator 100 other than the difference in the attaching positions of coil 40B and magnet 25. Therefore, hereinafter, same names and same reference numerals with "B" added thereto are applied to the same structural components as the structural components of vibration actuator 100, and description thereof is omitted as appropriate.

Vibration actuator 100B illustrated in FIG. 13 and FIG. 14 includes casing 11B of a cuboid external shape formed with base plate 12B and cover 13B. The shape of casing 11B in vibration actuator 100B of the embodiment is formed such that, among a height, a width, and a depth, the depth becomes the longest and the height becomes the shortest in any dimensions. Like casing 11, casing 11B may not be in a cuboid shape but may be in any other shapes such as a cubic shape as long as it is a shape capable of housing movable body 30B movably.

Vibration actuator 100B includes: fixing body 10B including casing 11B; movable body 30B that vibrates (one end side reciprocally oscillates) with respect to fixing body 10B inside casing 11B; and plate spring part 50B as a plate-like elastic body.

Like vibration actuators 100 and 100A, in vibration actuator 100B, one end of movable body 30B facing base plate 12B and has the other end supported by plate spring part 50B on the first end portion side reciprocally vibrates in the height direction with respect to base plate 12B.

Fixing body 10B includes base plate 12B, cover 13B, and coil 40B. Movable body 30B includes magnet 25, main body part 31B (yoke 32B and weight 34B), and contact parts 81B, and provided to be freely oscillatable with respect to fixing body 10B via plate spring part SOB provided between fixing body 10B and movable body 30B.

Base plate 12B is formed in a rectangular shape lengthy in the depth direction, has movable body 30B disposed on its surface side by being isolated therefrom, and configures hollow casing 11B together with cover 13B that covers movable body 30B. First end portion 122B of base plate 12B according to the embodiment is projected to outside from casing 11B, and coil wire 40a extruded out from coil 40B may be connected to a power supply part, not illustrated, on first end portion 122B to supply the electric power to coil 40B from the power supply part. Like the case of actuator 100, base plate 12B is formed with a plate material exhibiting conductivity together with cover 13B to be described later and functions as an electromagnetic shield.

On the first end portion side of the surface of base plate 12B, coil 40B is fixed with the winding direction facing toward the perpendicular direction with respect to the surface of base plate 12B.

Coil 40B together with magnet 25 generates a magnetic force to electromagnetically drive movable body 30B. Coil 40B is disposed on an outer periphery side of magnet 25 with a prescribed space provided therebetween surrounding the lower part of magnet 25 on movable body 30B side. Like coil 40 of actuator 100, coil 40B has a shape fitting the external shape of magnet 25, and is formed in an angular cylindrical shape herein.

Cover 13B together with base plate 12B has a function similar to that of cover 13 and base plate 12 of actuator 100 according to Embodiment 1. Cover 13B is attached to cover base plate 12B, and houses movable body 30B to be freely movable inside casing 11B that is formed together with base plate 12B. Top plate 131B of cover 13B is disposed by opposing to base plate 12B with movable body 30B interposed therebetween. Herein, top plate 131B is disposed in parallel to base plate 12B.

Compared to movable body 30, movable body 30B is different mainly in plate spring part 50B, an attaching configuration of plate spring part 50B, and contact parts 81B, and includes the magnet instead of the coil. That is, movable body 30B includes magnet 25 and main body part 31B.

In main body part 31B, yoke 32B having a first end portion to which plate spring part 50B as an elastic body is attached and weight 34B configuring a free end side may be disposed adjacent to each other and joined. Yoke 32B and weight 34B together with magnet 25 are joined to movable body fixing part 55B by being adjacent to each other in the front-and-back direction.

Yoke 32B together with magnet 25 is joined to movable body fixing part 55B on the first end portion side of movable body 30B. Yoke 32B is formed in a rectangular frame shape, and disposed with an opening direction facing toward the direction opposing to base plate 12B. Yoke 32B is fixed at its upper-end opening fringe part to movable body fixing part 55B as a second end portion of plate spring part 50B, and disposed at its lower-end opening fringe part facing toward base plate 12B side. Yoke 32B is fixed to movable body fixing part 55B surrounding magnet 25 disposed inside thereof with a prescribed space provided therefrom. The prescribed space between yoke 32B and the periphery of magnet 25 is a space to which coil 40B can be inserted in the top-and-bottom direction, that is, the moving direction. Specifically, it is the space with which coil 40B can be inserted between yoke 32B and magnet 25 without contacting each of those when movable body 30B makes an arc motion. As illustrated in FIG. 16, the lower end of yoke 32B opposes to the outer circumference of the upper end of coil 40B with a prescribed space provided in a horizontal direction. Note that yoke 32B is formed in the same thickness (length in the vibration direction) as that of weight 34B.

Magnet 25 is disposed to be capable of being inserted into and removed from coil 40B, and disposed on an inner side of yoke 32B in movable body 30B via movable body fixing part 55B.

It is preferable for magnet 25 to be disposed such that the magnetization direction is in parallel or on a same plane with the winding axis of coil 40B.

Like weight 34, weight 34B is a weight provided to movable body 30B supported by plate spring part 50B as a plate-like elastic body to increase output of vibrations of movable body 30B. Weight 34B in the embodiment is attached to yoke 32B in a direction orthogonal to the winding axis of coil 40B and to extend to an inverse side of the direction where plate spring part 50B extends on fixing body 10B side.

Note that weight 34B is formed with a material of high specific gravity such as tungsten that is of higher specific gravity than a material such as SECC. Thereby, when it is desired to increase the mass of movable body 30B whose external shape dimensions are set in design and the like, weight 34B may be formed with a high specific gravity material with the specific gravity of about 16 to 19 so that the mass for the specific gravity can be included in the mass of the movable body. As a result, the output of vibrations of movable body 30B can be increased.

Weight 34B is welded at the tip (second end portion) of movable body fixing part 55B.

Like actuators 100 and 100A, at the tip of weight 34B, contact parts 81B are attached at end faces (top and bottom faces of the tip end) in the oscillation directions, that is, in approaching and leaving directions with respect to base plate 12B and top plate 131B herein by opposing to base plate 12B and top plate 131B.

Contact parts 81B are dampers, and abut against base plate 12B and top plate 131B of cover 13B when movable body 30B oscillates. Operations and effects of contact parts 81B are similar to those of contact parts 81 and 81A, so that description thereof is omitted.

Plate spring part 50B is formed with a plate-like elastic body and, in the embodiment, formed with a plate spring.

Specifically, plate spring part 50B is formed by bending a long plate, and includes fixing body fixing part 51B to be fixed to fixing body 10B, elastically deformable arm part 53B, and movable body fixing part 55B to be fixed to movable body 30B.

As illustrated in FIG. 15, fixing body fixing part 51B is fixed on the first end portion side of the surface of base plate 12B by bonding, welding, or the like inside cover 13B. Arm part 53B includes rising plate part 531B extruded out to rise upward from the base end side of actuator 100B at fixing body fixing part 51B, and bending plate part 533B bent from rising plate part 531B to the tip side of actuator 100B along base plate 12B.

Movable body fixing part 55B is formed on a same plane with bending plate part 533B continuously from the tip of bending plate part 533B.

Movable body fixing part 55B is formed in a plate shape fitting the external shape of yoke 32B. At least one of movable body fixing part 55B and bending plate part 533B opposes to fixing body fixing part 51B.

Movable body fixing part 55B comes in surface-contact with the upper end face of the frame shape of yoke 32B and is fixed by bonding, welding, or the like, and fixes magnet 25 at a first end portion (upper end) in the magnetization direction inside yoke 32B.

Through plate spring part 50B, movable body 30B is disposed inside casing 11B at an intermediate position between base plate 12B and top plate 131B of cover 13B by being cantilevered substantially in parallel to each of base plate 12B and top plate 131B.

That is, in plate spring part 50B of the embodiment, fixing body fixing part 51B and at least one of bending plate part 533B and movable body fixing part 55B are disposed opposite to each other in parallel. Thereby, when attaching plate spring part 50B to fixing body 10B, it is unnecessary to secure the space for placing plate spring part 50B itself in the longitudinal direction of actuator 100B, that is, in the front-and-back direction. Therefore, more reduction in the size of actuator 100B itself can be achieved without decreasing the driving performance.

(Actions of Vibration Actuator 100B)

Vibration actuator 100B includes a magnetic circuit similar to that of vibration actuator 100 for electromagnetical driving similar to vibration actuator 100.

Through supplying electric power from the power supply part to energize coil 40B, movable body 30B is reciprocally vibrated in the height direction (lateral direction), that is, in approaching and leaving directions with respect to base plate 12B. Thereby, the second end portion of movable body 30B is oscillated.

For example, on vibration actuator 100B, generated is flow B2 of magnetic flux illustrated in FIG. 16. When power is supplied to coil 40B in vibration actuator 100B, an electric current flows in coil 40B that is disposed to be orthogonal to the magnetic flux from magnet 25. A repulsive force of the force generated in coil 40B based on Fleming's left hand rule by the Lorentz force generated thereby works as the thrust in F direction on magnet 25 of movable body 30B, so that movable body 30B is driven in F direction.

Movable body 30B is supported by plate spring part 50B on the first end portion side, so that, like movable body 300C illustrated in FIG. 17 with a broken line, a second end portion of movable body 30B on weight 34B side, that is, the tip end oscillates in F2 direction with one end side, that is, the based end side as the fulcrum. Thereby, the tip end on the free end side of movable body 30B collides with top plate 131B of cover 13B via contact part 81B (FIG. 17 illustrates a state where movable body 300C illustrated with a broken line collides, that is, contacts with top plate 131B via contact part 81B).

Further, when an electric current changed to an inverse direction is supplied to coil 40B (when the flowing direction of the electric current in FIG. 16 is inversed), coil 40B returns to the reference position at the time of change, and a repulsive force of the thrust generated in coil 40B by the Lorentz force works on magnet 25 as the −F thrust. Thereby, movable body 30B is driven in −F2 direction that is exactly opposite from F2 direction. Movable body 30B is supported by plate spring part S0B on the first end portion side, so that the second end portion of movable body 30B, that is, weight 34B side oscillates and moves in −F2 direction, and collides with base plate 12B via contact part 81B (a state of movable body 300D illustrated in FIG. 17 with a broken line).

That is, in vibration actuator 100B, coil 40B is energized by an alternating current wave input to coil 40B from a power supply part, and a magnetic attraction force and a repulsive force are effectively generated to magnet 25 on movable body 30B side. Thereby, magnet 25 on movable body 30B side acquires the thrust in F2 direction and −F2 direction with respect to the position to be the driving reference position (herein, the position at which the upper face of coil 40B is in the vicinity of the intermediate position in the magnetization direction of magnet 25) (see FIG. 16). Coil 40B reciprocally vibrates in F2 direction and −F2 direction along the height direction. That is, movable body 30B reciprocally vibrates with respect to fixing body 10B in an arc form in a direction orthogonal to base plate 12B. This driving principle is the same as that of actuator 100 according to Embodiment 1 and achieved by Expression (1) to (3) described above, so that description thereof is omitted.

With the embodiment, effects similar to those of actuator 100 according to Embodiment 1 can be acquired.

Especially, in vibration actuator 100B, movable body 30B is fixed to one end of a single plate spring part S0B and fixing body 10B is fixed to the other end of plate spring part S0B to support movable body 30B to be oscillatable, that is, to be vibratable. Thereby, compared to the conventional configuration in which the plate spring part is fixed to the movable body and the fixing body at a plurality of points, the configuration and design are simpler and space can be saved, so that vibration actuator 100B itself can be reduced in size.

Further, every time movable body 30B of vibration actuator 100B oscillates, movable body 30B is brought to collide (contact) alternately with base plate 12B and top plate 131B of cover 13B via contact parts 81B to vibrate casing 11B itself of vibration actuator 100B.

Thereby, vibration actuator 100B can allow the user to feel larger vibrations than the vibrations generated by an actual excitation force applied to movable body 30B via casing 11B. Therefore, vibration actuator 100B has such an advantage that preferable vibrations can be given to the skin as the mounting target through applying the excitation force to the perpendicular direction with respect to the mounting direction of the product to be incorporated even with the vibration actuator in which the excitation direction is the lateral direction.

Further, like vibration actuator 100, in vibration actuator 100B, magnet 25, yoke 32B, and coil 40B (a magnetic circuit as an electromagnetic driving section that generates the driving torque of movable body 30B) are disposed at base end side (end side where plate spring part 50B is joined) portion 30aB (see FIG. 16) of entire movable body 30B. Meanwhile, in movable body 30B, weight 34B is disposed at tip side portion 30bB of movable body 30B. Thereby, compared to the configuration in which the electromagnetic driving section that drives movable body 30B is disposed on the tip side of movable body 30B, rotation moment (mass in a rotation system) given to movable body 30B is increased. Therefore, it is possible to achieve high output of vibrations.

In addition, in actuator 100B, plate spring part 50B is formed in a U-shape. That is, in plate spring part 50B, fixing body fixing part 51B is disposed on a side closer to movable body fixing part 55B than arm part 53B between movable body fixing part 55B and fixing body fixing part 51B and fixed to base plate 12B. Thereby, length of a vibration generation system of base plate 12B, plate spring part 50B, and movable body 30B in the longitudinal direction can be shortened compared to the configuration in which fixing body fixing part 51B is disposed on a side closer to the base end than arm part 53B.

Further, in actuator 100B, magnet 25 is provided to movable body 30B and coil 40B is disposed on fixing body 10B to drive magnet 25 side by having the electromagnetic force or the repulsive force according to Fleming's left hand rule as the diving source. Thereby, connection between the coil and the power supply part becomes unnecessary, which may otherwise be required when moving the movable body by providing the coil to the movable body.

Embodiment 4

Figure 18:
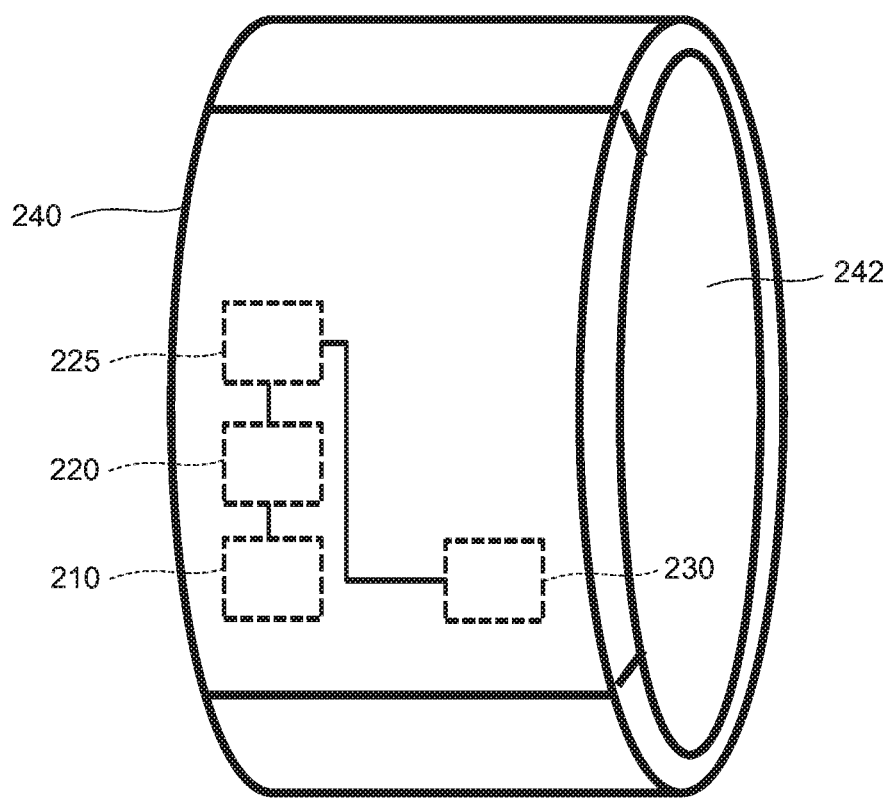
FIG. 18 is a schematic view illustrating a wearable terminal according to Embodiment 4 of the present invention.

FIG. 18 is a schematic view illustrating the configuration of main components of wearable terminal 200 according to Embodiment 4 of the present invention. Wearable terminal 200 is used by being worn by users. Herein, wearable terminal 200 functions as the so-called wearable input device that notifies incoming calls of a connected communication terminal to the user wearing the terminal with vibrations.

Wearable terminal 200 illustrated in FIG. 18 includes: communication apparatus 210; processor 220; vibration actuator 230 as a driving apparatus; and casing 240. Vibration actuator 230 employs one of vibration actuators 100, 100A, and 100B according to each of Embodiments 1 to 3. The bottom face of vibration actuator 230 is disposed to be adjacent to or in close contact with the inner peripheral face 242 of casing 240. On wearable terminal 200, one of vibration actuators 100, 100A, and 100B according to each of Embodiments 1 to 3 is mounted.

Casing 240 is formed in a ring shape, and worn on a finger of the user herein. In this case, the bottom face of vibration actuator 230 is located to overlap with the pad of the finger as a wearing body part. Thereby, vibration actuator 230 is worn to be in close contact with the part where mechanoreceptors are concentrated.

Communication apparatus 210 is connected to a radio communication terminal such as a mobile phone (not illustrated), a smartphone, or a mobile game machine via radio communications, and receives signals from the radio communication terminal and outputs those to processor 220.

Signals received in communication apparatus 210 from the radio communication terminal, for example, are incoming call signals and/or the like of the radio communication terminal received via a communication system such as Bluetooth (R).

Processor 220 converts the input signals to driving signals of vibration actuator 230 by a conversion circuit section (not illustrated) and outputs the converted signals to driving circuit section 225. Driving circuit section 225 is connected to a power supply part (coil wire 40a, power supply part 41) of vibration actuator 230 (100, 100A, 100B), and includes a circuit for driving vibration actuator 230 mounted thereon.

Through supplying the driving signals from the driving circuit section 225 to vibration actuator 230, vibration actuator 230 is driven.

Thereby, movable body 30, 30A, or 30B (see FIG. 1 to FIG. 17) is vibrated to vibrate wearable terminal 200. In casing 240 of wearable terminal 200, movable body 30, 30A, or 30B reciprocally vibrates in a direction crossing with, specifically, in a direction orthogonal to the bottom face (corresponding to bottom face of base plate 12, 12A, or 12B) of vibration actuator 230. In vibration actuator 100, 100A, or 100B, movable body 30, 30A, or 30B contacts with base plate 12, 12A, or 12B (see FIG. 1 to FIG. 17) every time the movable body vibrates. Thereby, along with vibrations of movable body 30, 30A, or 30B, the impact when contacting with base plate 12, 12A, or 12B due to vibrations is transmitted to the finger of the user more directly via the bottom face as vibrations. That is, it is possible to give perpendicular vibrations to the surface of the skin of the finger or the like on which the wearable terminal is mounted, so that the vibrations felt through the body of the user can be increased still more without changing the external shape and without increasing the size of the vibratory device itself to be kept in a prescribed size compared to the configuration with which the vibration actuator vibrates along the back side of the finger.

Further, movable body 30, 30A, or 30B contacts with fixing body 10, 10A, or 10B via contact parts 81, 81A, or 81B every time the movable body vibrates. This makes it possible to generate large vibrations. Further, because movable body 30, 30A, or 30B reciprocally oscillates and contacts with fixing body 10, 10A, or 10B, the amount of vibrations generated thereby becomes constant so that it is possible to supply a product with stable output of vibrations.

Note that wearable terminal 200 may be an incoming notification function device including communication apparatus 210, processor 220, and vibration actuator 230 as a driving apparatus. Thereby, the incoming notification function device may be a configuration in which incoming calls from outside acquired by a radio communication terminal such as a mobile phone, a smartphone, or a mobile game machine is informed to the user by driving the vibration actuator. In addition to the incoming call signals, vibrations corresponding to signals such as mails input to an information communication terminal from an external apparatus or vibrations according to operations of games may be increased as vibrations of vibration actuator 230 to be given to the users as the vibrations felt via the body. Further, a position detection section such as an acceleration sensor detecting positional information of wearable terminal 200 may be provided to wearable terminal 200, and processor 220 may vibrate vibration actuator 230 according to the positional information of wearable terminal 200 detected by the position detection section while transmitting the positional information of wearable terminal 200 to outside via communication apparatus 210. Thereby, for example, by wearing wearable terminal 200 on the wrist or the finger of the user and simply moving the wrist or the finger to draw a character in the air, wearable terminal 200 vibrates in accordance with the movement, that is, in accordance with the position of wearable terminal 200 and characters or numerals formed based on the detected positional information can be input to the apparatus connected wirelessly. Further, it is also possible to connect to a display apparatus and to provide a function capable of displaying incoming calls from outside on the connected display apparatus such as a display and selecting information displayed on the display apparatus so as to drive vibration actuator 230 by processor 20 by corresponding to the selection.

Figure 19:
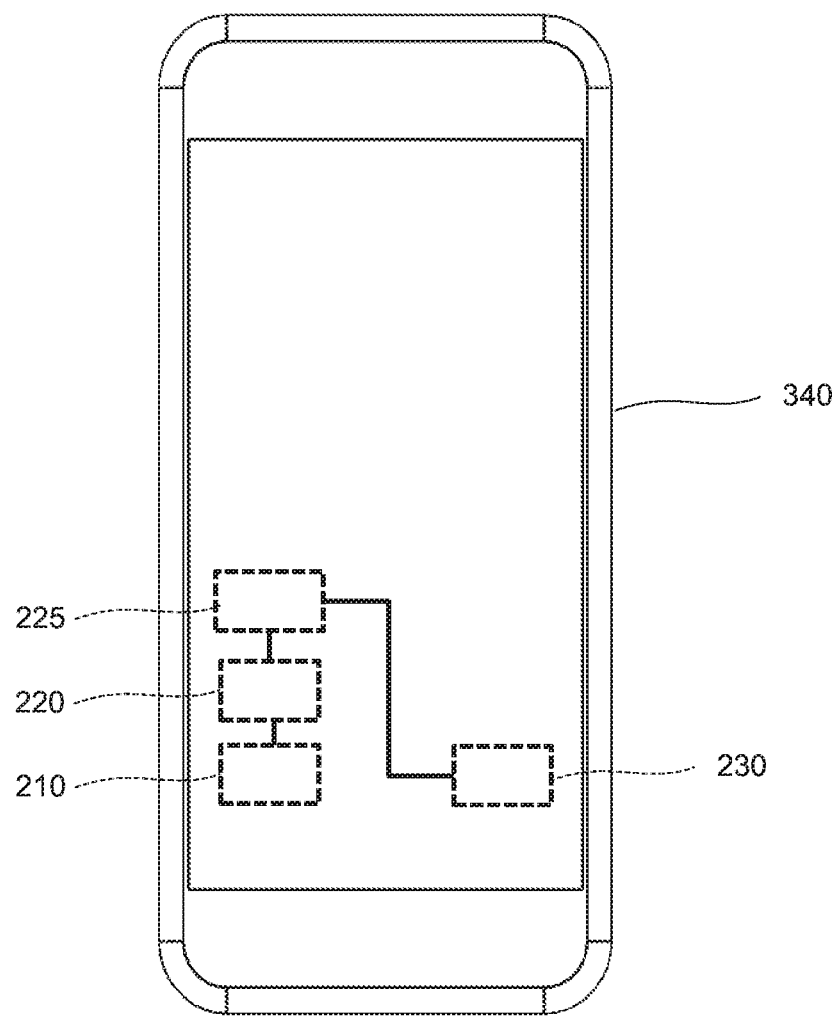
FIG. 19 is a schematic view illustrating a mobile terminal as a modification example of Embodiment 4 according to the present invention.

For example, as illustrated in FIG. 19, similar effects can be achieved through mounting actuator 230 that employs one of vibration actuator 100, 100A, or 100B according to each of Embodiments 1 to 3 on mobile terminal 300. Like wearable terminal 200, mobile terminal 300 includes, inside casing 340: communication apparatus 210, processor 220, driving circuit section 225, and vibration actuator 230 as a driving apparatus. With mobile terminal 300, it is possible to process signals of each function of mobile terminal 300 by processor 220 and vibrate vibration actuator 230 via driving circuit section 225 to notify the user in addition to notifying incoming calls from outside acquired by a radio communication terminal such as a mobile phone, a smartphone, or a mobile game machine through vibrating vibration actuator 230.

While vibration actuators 100 and 100A according to each of Embodiments 1 and 2 are configured by using two magnets (first magnets 21, 21A and second magnets 22, 22A), the configuration is not limited only to that. It is also possible to employ a configuration that uses only the first magnets 21, 21A or the second magnets 22, 22A disposed with the same polarity opposing to each other.

When casings 11, 11A, and 11B do not have the part corresponding to top plates 131, 131A, and 131B in each of vibration actuators 100, 100A, and 100B, movable bodies 30, 30A, and 30B reciprocally vibrate in approaching and leaving directions with respect to the part corresponding to base plates 12, 12A, and 12B.

It should be understood that the embodiments disclosed herein are illustrative and not restrictive in any respect, since the scope of the invention is defined by the appended claims rather than by the above description, and all changes that fall within metes and bounds of the appended claims or equivalence of such metes and bounds thereof, are therefore intended to be embraced. While the embodiments of the present invention have been described above, those embodiments are presented by way of examples of the preferred embodiments of the present invention and not intended to limit the scope of the present invention. That is, descriptions of configurations of the apparatus and shapes of each component are to be construed as illustrative only, and it is apparent that various changes and modifications are possible without departing from the scope of the present invention.

The disclosure of Japanese Patent Application No. 2017-004663, filed on Jan. 13, 2017, including the specification, drawings and abstract, is incorporated herein by reference in its entirety.

INDUSTRIAL APPLICABILITY

The vibration actuator according to the present invention can be formed in a small size, is excellent in assemblability and durability, and vibrates in a fine manner even formed in a small flat shape, so that the present invention is suitable to be used as an incoming notification function device that notifies incoming calls from a wearable terminal capable of communicating with an information communication terminal and the information communication terminal such as a mobile phone by allowing the user to feel the vibrations via the body.

REFERENCE SIGNS LIST 10, 10A, 10B Fixing body
11, 11A, 11B, 240, 340 Casing
12, 12A, 12B Base plate
13, 13A, 13B Cover
14, 14A First magnet holder
15, 15A Second magnet holder
21, 21A First magnet (magnet)
22, 22A Second magnet (magnet)
25 Magnet
30, 30A, 30B, 300A, 300B, 300C, 300D Movable body
31, 31A, 31B Main body part
32, 32A Coil holder
32B Yoke
34, 34A, 34B Weight
40, 40A, 40B Coil
40a Coil wire
41 Power supply part
49 Wire
50, 50A, 50B Plate spring part (elastic body)
51, 51A, 51B Fixing body fixing part
53, 53A, 53B Arm part
55, 55A, 55B Movable body fixing part
81, 81A, 81B Contact part
100, 100A, 100B, 230 Vibration actuator
122, 122B First end portion of base plate
131, 131A, 131B Top plate
200 Wearable terminal
300 Mobile terminal
531, 531A, 531B Rising plate part
533, 533A, 533B Bending plate part

What is claimed is:

1. A vibration actuator, comprising:
a fixing body including a magnet;
a movable body including a coil holder, a coil and a weight, and configured to reciprocally move in a vibration direction with respect to the fixing body by cooperation work of the coil that is to be energized and the magnet; and
an elastic body movably supporting the movable body with respect to the fixing body, wherein:
the coil is disposed on an inner side of the coil holder, and the coil holder holds an outer periphery face of the coil,
the elastic body is fixed at one side face of the coil holder, and the weight is fixed at another side face of the coil holder opposite the elastic body,
the coil and the magnet are provided on the fixing body and the movable body such that the magnet is capable of being inserted into and removed from the coil in the vibration direction,
the elastic body is disposed on an opposite side of the weight with respect to the coil over an entire length of the elastic body in a direction intersecting the vibration direction,
the elastic body is a plate-like elastic body with one end being fixed to the fixing body and another end being fixed to the coil holder to support the movable body with a cantilever structure to be capable of reciprocally oscillating in the vibration direction, and one end of the weight is a free end and another end of the weight is fixed to the coil holder.

2. The vibration actuator according to claim 1, wherein:
the fixing body includes a casing for housing the movable body to be freely movable; and
the elastic body is fixed to the fixing body and the movable body along a longitudinal direction of the casing, and supports the movable body to be oscillatable in a direction crossing with the longitudinal direction.

3. The vibration actuator according to claim 2, wherein the casing is in a cuboid shape.

4. The vibration actuator according to claim 1, wherein the elastic body is formed to have a substantially U-shape in sectional view such that the one end and the other end are isolated and opposed to each other.

5. The vibration actuator according to claim 1, wherein the movable body comprises a contact part making contact with the fixing body and transmitting vibrations when the movable body oscillates.

6. The vibration actuator according to claim 5, wherein the contact part is a damper that eases impact of the contact.

7. A wearable terminal, comprising the vibration actuator according to claim 1 mounted thereon.

8. An incoming notification function device, comprising the vibration actuator according to claim 1 mounted thereon.

\* \* \* \* \*